United States Patent
McMillan et al.

(10) Patent No.: US 11,718,257 B2
(45) Date of Patent: Aug. 8, 2023

(54) COUPLING DEVICE FOR MOUNTING AN AIRBAG MODULE TO BE OSCILLATING ON A VEHICLE STEERING WHEEL

(71) Applicants: ZF PASSIVE SAFETY SYSTEMS US INC., Washington, MI (US); ZF AUTOMOTIVE SAFETY GERMANY GMBH, Aschaffenburg (DE)

(72) Inventors: AnnMarie McMillan, Washington, MI (US); Jeffrey M. Ruprecht, Rochester Hills, MI (US); James Steele, Macomb, MI (US); Dominik Schuetz, Heimbuchenthal (DE)

(73) Assignees: ZF Passive Safety Systems US Inc, Washington, MI (US); ZF AUTOMOTIVE SAFETY GERMANY GMBH, Aschaffenburg (DE)

( * ) Notice: Subject to any disclaimer, the term of this patent is extended or adjusted under 35 U.S.C. 154(b) by 0 days.

(21) Appl. No.: 17/968,900

(22) Filed: Oct. 19, 2022

(65) Prior Publication Data

US 2023/0044002 A1 Feb. 9, 2023

Related U.S. Application Data

(60) Division of application No. 16/360,120, filed on Mar. 21, 2019, now Pat. No. 11,498,506, which is a
(Continued)

(51) Int. Cl.
*B60R 21/203* (2006.01)
*B60Q 5/00* (2006.01)
(Continued)

(52) U.S. Cl.
CPC ........... *B60R 21/203* (2013.01); *B60Q 5/003* (2013.01); *B60R 21/2037* (2013.01);
(Continued)

(58) Field of Classification Search
CPC . B60R 21/203; B60R 21/2037; B60R 21/235; B60R 2021/23504; B60Q 5/003; B62D 1/11
See application file for complete search history.

(56) References Cited

U.S. PATENT DOCUMENTS 3,133,769 A * 5/1964 Drake ..................... F16C 33/22
384/145
3,756,551 A 9/1973 Bishop
(Continued)

FOREIGN PATENT DOCUMENTS

DE 19653684 A1 6/1998
EP 1790536 A2 5/2007
(Continued)

*Primary Examiner* — Paul N Dickson
*Assistant Examiner* — Timothy Wilhelm
(74) *Attorney, Agent, or Firm* — Tarolli Sundheim Covell & Tummino LLP

(57) ABSTRACT

A coupling device (16) for mounting an airbag module (14) to be oscillating on a steering wheel structure (12) of a vehicle steering wheel (10) includes a mounting member (18) which includes, relative to a steering wheel axis, an axial bottom side (20) which in the assembled state of the vehicle steering wheel (10) faces the steering wheel structure (12) as well as an opposite axial top side (22) which in the assembled state of the vehicle steering wheel (10) faces the airbag module (14), a contact face (24) for a damping element (26) provided on the axial bottom side (20) for oscillating coupling of the mounting member (18) to the steering wheel structure (12), and comprising a locking element (28) disposed on the top side (22) of the mounting member (18) for locking with the prefabricated airbag
(Continued)

module (14), wherein the locking element (28) is configured so that the airbag module (14) can be coupled to the mounting member (18) by a locking connection substantially in an axially fixed manner or in an axially restrictedly movable manner.

20 Claims, 18 Drawing Sheets

Related U.S. Application Data continuation-in-part of application No. PCT/EP2017/070144, filed on Aug. 9, 2017.

(60) Provisional application No. 62/647,115, filed on Mar. 23, 2018.

(51) Int. Cl.
  B60R 21/235 (2006.01)
  B62D 1/11 (2006.01)

(52) U.S. Cl.
  CPC .............. *B60R 21/235* (2013.01); *B62D 1/11* (2013.01); *B60R 2021/23504* (2013.01)

(56) References Cited

U.S. PATENT DOCUMENTS

| | | | | |
|---|---|---|---|---|
| 4,445,598 A * | 5/1984 | Brambilla | ............... | F16F 9/364 |
| | | | | 188/315 |
| 4,566,855 A * | 1/1986 | Costabile | ................. | B63H 1/20 |
| | | | | 416/169 R |
| 4,789,763 A | 12/1988 | Nagata et al. | | |
| 4,916,749 A * | 4/1990 | Urban | ................... | F16C 27/063 |
| | | | | 384/138 |
| 5,023,412 A * | 6/1991 | Ishida | .................... | H01H 13/12 |
| | | | | 200/61.57 |
| 5,024,464 A | 6/1991 | Kawaguchi et al. | | |
| 5,100,114 A * | 3/1992 | Reuter | ................... | F16C 27/063 |
| | | | | 267/293 |
| 5,201,679 A * | 4/1993 | Velte, Jr. | ................. | B63H 23/34 |
| | | | | 440/49 |
| 5,333,897 A * | 8/1994 | Landis | ................ | B60R 21/2037 |
| | | | | 200/61.54 |
| 5,342,697 A * | 8/1994 | Helle | ....................... | B22F 7/062 |
| | | | | 277/922 |
| 5,380,037 A | 1/1995 | Worrell et al. | | |
| 5,409,256 A | 4/1995 | Gordon et al. | | |
| 5,410,114 A * | 4/1995 | Furuie | .................... | B60Q 5/003 |
| | | | | 200/61.55 |
| 5,762,359 A * | 6/1998 | Webber | ............... | B60R 21/2035 |
| | | | | 280/728.2 |
| 5,871,234 A | 2/1999 | Umemura et al. | | |
| 6,036,223 A | 3/2000 | Worrell et al. | | |
| 6,062,592 A | 5/2000 | Sakurai et al. | | |
| 6,299,201 B1 * | 10/2001 | Fujita | .................... | B60Q 5/003 |
| | | | | 74/552 |
| 6,312,012 B1 * | 11/2001 | Bohn | .................. | B60R 21/2037 |
| | | | | 200/61.54 |
| 6,354,622 B1 | 3/2002 | Ulbrich et al. | | |
| 6,457,379 B1 * | 10/2002 | Mirone | .................. | B60Q 5/003 |
| | | | | 200/61.54 |
| 6,464,247 B1 | 10/2002 | Laue | | |
| 6,485,241 B1 * | 11/2002 | Oxford | ............... | B60R 11/0217 |
| | | | | 181/150 |
| 6,508,485 B2 * | 1/2003 | Kikuta | ................... | B60Q 5/003 |
| | | | | 200/61.54 |
| 6,572,138 B1 | 6/2003 | Bohn et al. | | |
| 6,592,141 B1 | 7/2003 | Dancasius et al. | | |
| 6,600,114 B2 * | 7/2003 | Kikuta | ................... | B60Q 5/003 |
| | | | | 200/61.54 |
| 6,682,092 B2 * | 1/2004 | Schutz | ................... | B60Q 5/003 |
| | | | | 280/728.2 |
| 6,722,227 B2 * | 4/2004 | Rabagliano | ............ | B60Q 5/003 |
| | | | | 200/61.54 |
| 6,874,808 B2 * | 4/2005 | Marath | ............... | B60R 21/2037 |
| | | | | 280/728.2 |
| 6,881,911 B2 * | 4/2005 | Sugimoto | .............. | B60Q 5/003 |
| | | | | 200/61.54 |
| 6,995,328 B2 * | 2/2006 | Sugimoto | ......... | B60R 21/21658 |
| | | | | 200/61.54 |
| 7,077,573 B2 * | 7/2006 | Suh | ....................... | F16C 33/106 |
| | | | | 384/129 |
| 7,264,097 B2 | 9/2007 | Yasumoto et al. | | |
| 7,268,309 B2 * | 9/2007 | Sugimoto | ......... | B60R 21/21658 |
| | | | | 200/61.54 |
| 7,322,602 B2 * | 1/2008 | Tsujimoto | ........... | B60R 21/2037 |
| | | | | 200/61.54 |
| 7,360,786 B2 | 4/2008 | Tsujimoto et al. | | |
| 7,367,744 B2 * | 5/2008 | Funke | ................ | B60G 21/0551 |
| | | | | 280/124.152 |
| 7,401,789 B2 * | 7/2008 | Harer | .................... | F16J 15/3216 |
| | | | | 180/428 |
| 7,464,959 B2 * | 12/2008 | Pillsbury, IV | ......... | B60Q 5/003 |
| | | | | 200/61.55 |
| 7,556,281 B2 * | 7/2009 | Olesko | ................ | B60R 21/2035 |
| | | | | 280/728.2 |
| 7,823,908 B2 * | 11/2010 | Matsu | ................. | B60R 21/2037 |
| | | | | 280/728.2 |
| 8,205,908 B2 * | 6/2012 | Matsu | ................. | B60R 21/2035 |
| | | | | 280/728.2 |
| 8,263,850 B2 * | 9/2012 | Hashimoto | ............... | G10H 1/32 |
| | | | | 84/723 |
| 8,286,766 B2 | 10/2012 | Terada et al. | | |
| 8,342,567 B2 * | 1/2013 | Sasaki | .................... | B60Q 5/003 |
| | | | | 200/61.55 |
| 8,419,052 B2 * | 4/2013 | Yamaji | ................ | B60R 21/2037 |
| | | | | 280/728.2 |
| 8,556,292 B2 * | 10/2013 | Umemura | ............... | B62D 7/222 |
| | | | | 280/731 |
| 8,567,818 B2 * | 10/2013 | Umemura | .............. | B60R 21/203 |
| | | | | 280/728.2 |
| 8,616,577 B1 * | 12/2013 | Matsu | ................. | B60R 21/2037 |
| | | | | 280/728.2 |
| 8,720,942 B2 * | 5/2014 | Onohara | ............. | B60R 21/2037 |
| | | | | 74/552 |
| 8,733,203 B2 | 5/2014 | Kondo et al. | | |
| 8,794,662 B2 * | 8/2014 | Ishii | .................... | B60R 21/2037 |
| | | | | 280/728.2 |
| 8,827,558 B2 * | 9/2014 | Heintschel | ............... | F16C 33/74 |
| | | | | 384/16 |
| 8,851,512 B2 * | 10/2014 | Umemura | ............. | B60R 21/203 |
| | | | | 280/731 |
| 8,919,812 B2 * | 12/2014 | Schutz | ................ | B60R 21/2037 |
| | | | | 280/728.2 |
| 8,939,466 B2 * | 1/2015 | James | ................. | B60R 21/2037 |
| | | | | 280/731 |
| 8,985,623 B2 * | 3/2015 | Kondo | .................. | F16F 7/1028 |
| | | | | 280/731 |
| 9,016,719 B2 * | 4/2015 | Amamori | ............. | B60R 21/203 |
| | | | | 280/731 |
| 9,085,278 B2 * | 7/2015 | Kiuchi | ................ | B60R 21/2037 |
| 9,139,150 B2 * | 9/2015 | Oh | ........................ | B60R 21/2037 |
| 9,156,400 B2 * | 10/2015 | Ishii | .................... | B60R 21/2037 |
| 9,195,257 B2 * | 11/2015 | Miyahara | ................. | G05G 1/10 |
| 9,365,177 B2 * | 6/2016 | Bachmann | ............ | B60R 21/203 |
| 9,366,311 B2 * | 6/2016 | Gustavsson | ............. | F16F 7/108 |
| 9,550,525 B2 * | 1/2017 | Ishii | .................. | B60R 21/21658 |
| 9,561,772 B2 * | 2/2017 | Andersson | ........... | B60R 21/2037 |
| 9,783,147 B2 * | 10/2017 | Spencer | ............. | B60R 21/2035 |
| 9,816,577 B2 * | 11/2017 | Fischer | ............. | F16D 55/22655 |
| 9,840,314 B2 * | 12/2017 | Kuroki | ....................... | F16D 3/12 |
| 10,023,221 B2 * | 7/2018 | Obayashi | ................. | B62D 7/222 |
| 10,024,359 B2 * | 7/2018 | Westnedge | ............ | F16F 1/3835 |
| 10,196,028 B2 * | 2/2019 | Yamami | .............. | B60R 21/2037 |
| 10,315,605 B2 * | 6/2019 | Ishii | .................... | B60R 21/2037 |
| 10,351,089 B2 * | 7/2019 | Ishii | .................... | B60R 21/2037 |
| 10,377,335 B2 * | 8/2019 | Ishii | .................... | B60R 21/2035 |
| 10,406,975 B2 * | 9/2019 | Obayashi | ................. | B60Q 5/003 |
| 10,875,564 B2 * | 12/2020 | Minami | ....................... | B62D 1/04 |

(56) References Cited

U.S. PATENT DOCUMENTS

| | | |
|---|---|---|
| 10,926,698 B2 * | 2/2021 | Gothekar ............... B62D 7/222 |
| 11,161,472 B2 * | 11/2021 | Schütz ................... B60Q 5/003 |
| 11,305,716 B2 * | 4/2022 | Hirota ............... B60R 21/21656 |
| 11,383,751 B2 * | 7/2022 | Kim ......................... B62D 1/10 |
| 2002/0036397 A1 | 3/2002 | Fujita et al. |
| 2003/0067143 A1 | 4/2003 | Nelson et al. |
| 2004/0026908 A1 | 2/2004 | Schneider et al. |
| 2004/0094937 A1 | 5/2004 | Steimke |
| 2006/0197323 A1 | 9/2006 | Pillsbury, IV et al. |
| 2006/0208469 A1 | 9/2006 | Rueger et al. |
| 2009/0218739 A1 * | 9/2009 | Terada ................ B60R 21/2037 |
| | | 267/136 |
| 2009/0261560 A1 | 10/2009 | Nakagawa et al. |
| 2010/0130078 A1 * | 5/2010 | Okabe ...................... F16D 3/66 |
| | | 440/75 |
| 2010/0219621 A1 * | 9/2010 | Sasaki ................... B60Q 5/003 |
| | | 280/731 |
| 2011/0120258 A1 * | 5/2011 | Kondo ................... B60Q 5/003 |
| | | 74/552 |
| 2011/0204602 A1 | 8/2011 | James et al. |
| 2013/0026741 A1 * | 1/2013 | Onohara ............. B60R 21/2037 |
| | | 74/552 |
| 2013/0076011 A1 * | 3/2013 | Umemura .............. B60Q 5/003 |
| | | 280/728.2 |
| 2013/0239739 A1 | 9/2013 | Miyahara et al. |
| 2014/0131982 A1 * | 5/2014 | Ishii .................... B60R 21/2037 |
| | | 280/728.2 |
| 2014/0313982 A1 | 10/2014 | Schwarzbauer |
| 2016/0031399 A1 | 2/2016 | Andersson |
| 2016/0031480 A1 * | 2/2016 | Ishii ....................... B60Q 5/003 |
| | | 280/731 |
| 2017/0297604 A1 | 10/2017 | Raikar et al. |
| 2017/0361801 A1 * | 12/2017 | Banno ................. B60R 21/2037 |

FOREIGN PATENT DOCUMENTS

| | | |
|---|---|---|
| JP | 2003154943 A | 5/2003 |
| JP | 2003327131 A | 11/2003 |
| JP | 2006096127 A | 4/2006 |
| JP | 2009262785 A | 11/2009 |
| JP | 2011046352 A | 3/2011 |
| JP | 2012056461 A | 3/2012 |
| KR | 20020031810 A | 5/2002 |
| WO | 2011054449 A1 | 5/2011 |
| WO | 2016170051 A1 | 10/2016 |
| WO | 2018/108335 | 6/2018 |

* cited by examiner

COUPLING DEVICE FOR MOUNTING AN AIRBAG MODULE TO BE OSCILLATING ON A VEHICLE STEERING WHEEL

RELATED APPLICATION

This application is a divisional application of U.S. application Ser. No. 16/360,120, filed Mar. 21, 2019, which is a continuation-in-part of International Application No. PCT/EP2017/070144, filed on Aug. 9, 2017, which claims priority from German Application No. DE 10 2016 124 530.5, filed on Dec. 15, 2016. U.S. application Ser. No. 16/360,120 also claims the benefit of U.S. Provisional Application Ser. No. 62/647,115, filed Mar. 23, 2018. The disclosures of these applications are hereby incorporated by reference in their entireties.

TECHNICAL FIELD

The invention relates to a coupling device for mounting an airbag module to be oscillating on a steering wheel structure of a vehicle steering wheel as well as to a subassembly and to a vehicle steering wheel comprising said coupling device.

BACKGROUND

In a plurality of vehicle steering wheels vibrations which the driver feels uncomfortable with are occurring during idling or in particular speed ranges of the vehicle. Said vibrations are due, inter alia, to the rigid coupling of the steering wheel to the steering column.

It is known to employ so-called vibration dampers to avoid undesired steering wheel vibrations so as to adjust the natural frequency of the overall system such that it is within an uncritical range. At present, for example the gas generator of an airbag module disposed within the steering wheel is used as a counter-oscillating damper mass.

Since vibration damping improves with an increasing damper mass, in DE 37 10 173 C2 already a vehicle steering is described in which the entire airbag module is advantageously used as a damper mass. By means of the shear stiffness of the vibration dampers used, the first natural frequency of the steering wheel/module system can be adjusted to be so low that it will be within a speed range of the vehicle in which high exciting amplitudes will not yet occur (for example at about 120 km/h).

In the case of oscillating airbag modules, the vibration dampers are currently also used to realize a horn function at the vehicle steering wheel, with a horn contact being provided at the airbag module and a respective mating contact being provided at the steering wheel structure. Such vehicle steering wheel is disclosed, for example, in U.S. Pat. No. 8,720,942 B2.

However, it has turned out that in steering wheels of this type especially on rough road tracks faulty activations of the vehicle horn will occur or, as compared to steering wheels having no vibration damping, longer contacting distances or higher contacting forces are required to activate the vehicle horn. This entails clearances of undesired large size at the vehicle steering wheel and impaired comfort when activating the vehicle horn.

SUMMARY

It is the object of the invention to provide a vehicle steering wheel of simple constructional design including a vibration damper having an integrated horn function which has an as short actuating path as possible and an as low actuating force as possible while a high functional safety is given.

In accordance with the invention, this object is achieved by a coupling device for mounting a prefabricated airbag module so as to be oscillating on a steering wheel structure of a vehicle steering wheel, comprising a mounting member including, relative to a steering wheel axis, an axial bottom side which in the assembled state of the vehicle steering wheel faces the steering wheel structure and an opposite axial top side which in the assembled state of the vehicle steering wheel faces an airbag module, a contact face provided on the axial bottom side for a damping element for oscillating coupling of the mounting member to the steering wheel structure, as well as a locking element disposed on the top side of the mounting member for engaging in the airbag module, wherein the locking element is configured so that the airbag module can be coupled to the mounting member by a locking connection substantially in an axially fixed manner or in an axially restrictedly movable manner. Hence, with respect to the mounting member of the coupling device, on the side of the steering wheel structure a vibration damping takes place (especially transversely to the steering wheel axis), whereas on the module side a horn function can be realized (in the direction of the steering wheel axis). In this way, the horn function and the vibration damping function are separated from each other in a simple manner so that vibration excitations of the steering column and of the steering wheel structure tightly connected thereto (e.g. on rough road tracks) are initially damped between the steering wheel structure and the mounting member and no longer have an immediate effect on the module-side horn function. An oscillating coupling of the mounting member to the steering wheel structure by the damping element is to be understood within the scope of the present application in such way that the damping element enables damped vibration between the mounting member and the steering wheel structure at least transversely to the steering wheel axis, preferably also in the direction of the steering wheel axis. The maximum amplitude of possible vibration in the direction of the steering wheel axis is preferably smaller than an axial actuating path for activating a vehicle horn.

The mounting member of the coupling device preferably is a mounting plate that extends substantially perpendicularly to the steering wheel axis and especially includes plural locking elements, the locking elements being preferably formed integrally with the mounting plate. Further, the locking elements may be identically spaced from the steering wheel axis and may be arranged to be evenly spread in the circumferential direction. This results in simple and quick assembly of the coupling device as well as in stable support of the airbag module. Alternatively, it is also imaginable, as a matter of course, to provide plural separate mounting members each having a locking element for mounting the airbag module in an oscillating manner on the steering wheel structure.

A damping element may be associated with each locking element, with the locking elements and the associated damping elements being arranged axially in series.

According to one embodiment of the coupling device, on the axial top side of the mounting member a horn contact or an actuating member for activating a beep upon contact between the horn contact and a mating contact disposed at the airbag module is arranged, wherein the locking element is configured so that the airbag module can be coupled to the mounting member in an axially restrictedly movable manner by the locking connection. In other words, in this case the entire airbag module is axially displaced for actuating the vehicle horn, wherein both the horn contact and the mating contact are formed on components of the vehicle steering wheel that are supported so as to be oscillating.

According to another embodiment, the coupling device includes a damping element which is adjacent to the axial bottom side of the mounting member in the area of the contact surface and couples the mounting member to the steering wheel structure in an oscillating manner so that the mounting member and the steering wheel structure are movable relative to each other at least transversely to the steering wheel axis, especially wherein the damping element is preassembled at the axial bottom side of the mounting member. The damping element comprises a vibration-damping material as well as, optionally, stop elements and/or mounting sleeves abutting on the vibration-damping material.

In this embodiment, the damping element preferably extends through an opening of the mounting member.

Moreover, the damping element may comprise an annular vibration-damping material having a radial shoulder, with an edge of the mounting member opening forming a contact face and acting on the radial shoulder of the vibration-damping material.

In particular, the radial shoulder is in the form of a groove in the vibration-damping material, with the edge of the mounting member opening at least in portions engaging in the groove. This enables the damping element to be axially positioned and fixed on the mounting member in a quick and simple manner.

Incidentally, the object stated in the beginning is achieved by a subassembly comprising a steering wheel structure, an afore-described coupling device and a screw for mounting the coupling device to the steering wheel structure which extends through the annular vibration-damping material, the vibration-damping material being adjacent with an axial end face at least in portions to a screw head of the screw and/or being adjacent with an opposite axial end face at least in portions to the steering wheel structure. The limitation of the accommodating space for the vibration-damping material by components present anyway such as the mounting member, the screw head and/or the steering wheel structure is especially advantageous, because in such case separate mounting sleeves and/or stop elements can be dispensed with. Ideally the damping element then is formed exclusively by the vibration-damping material.

Further, the invention comprises a subassembly including a steering wheel structure, an afore-described coupling device and a damping element for oscillating coupling of the mounting member to the steering wheel structure, wherein the damping element is arranged on the axial bottom side of the mounting member and is preassembled together with the mounting member on the steering wheel structure.

The invention also comprises a subassembly having a prefabricated airbag module and an afore-described coupling device, wherein the airbag module, especially a module bottom of the airbag module, includes a mating contact axially abutting on the horn contact, and wherein the airbag module is supported so as to be axially movable relative to the mounting member for activating a beep.

The invention further relates to a subassembly comprising a prefabricated airbag module as well as an afore-described coupling device, wherein the airbag module includes a (manually operable) module cover including a horn contact as well as another module component including a mating contact axially abutting on the horn contact, the module cover being supported to be axially movable relative to the further module component for activating a beep. In other words, the horn function is realized in this case "inside" the airbag module, wherein also in this configuration variant the horn contact and the mating contact are formed on components of the vehicle steering wheel supported so as to be oscillating.

Finally, the object stated in the beginning is also achieved by a vehicle steering wheel of an automotive vehicle comprising a steering wheel structure, a prefabricated airbag module, an afore-described coupling device and a damping element for oscillating coupling of the mounting member to the steering wheel structure, wherein the vehicle steering wheel includes a horn contact and a mating contact axially abutting on the horn contact, and wherein both the horn contact and the mating contact are formed on components of the vehicle steering wheel that are supported to be oscillating. In particular, the coupling device and the damping element constitute a damper unit being preassembled on the steering wheel structure. In this way, the vehicle steering wheel can be assembled with especially little effort. The prefabricated damper unit is first connected, especially screwed, to the steering wheel structure, whereupon the equally prefabricated airbag module is axially fed until it locks with the damper unit and thus is secured to the steering wheel structure.

In an especially simply designed embodiment of the vehicle steering wheel, the airbag module is secured to the steering wheel structure exclusively by the locking connection to the coupling device.

As an alternative, it is also imaginable, however, that an additional (locking) connection is provided between the airbag module and the steering wheel structure which during normal driving of the vehicle admits a limited relative movement, to be sure, but upon activation of the airbag module ensures that the airbag module does not completely detach from the steering wheel structure. Consequently, the airbag module in this embodiment is secured to the steering wheel structure by means of the coupling device, wherein moreover another connection independent of the coupling device is provided between the airbag module and the steering wheel structure. This is of advantage as the connections to the coupling device in this case need not be designed for the extreme loads occurring, for example, upon activation of the airbag module.

According to one aspect, an apparatus for mounting an airbag module to a steering wheel structure of a vehicle steering wheel includes a coupling device for coupling the airbag module to the steering wheel structure. The coupling device includes a mounting member including a sleeve having a central opening and being connected to the airbag module. The apparatus also includes a fastening structure that extends through the central opening of the sleeve and connects the coupling device to the steering wheel structure. The apparatus further includes a damping element constructed of a vibration damping material and being connected to the sleeve. The damping element completely isolates the airbag module from the steering wheel structure.

According to another aspect, alone or in combination with any other aspect, the damping element can have a cylindrical configuration and can be supported in the central opening of the sleeve. The fastening structure can include a screw that extends through a central opening of the damping element.

According to another aspect, alone or in combination with any other aspect, the damping element can include a surface feature that engages a surface feature of the mounting member to help maintain the connection between the damping element and the mounting member.

According to another aspect, alone or in combination with any other aspect, the damping element can include an upper end that engages a head of the screw and a lower end that engages the steering wheel structure.

According to another aspect, alone or in combination with any other aspect, the damping element can include a surface feature that engages a surface feature of the mounting member to help maintain the connection between the damping element and the mounting member.

According to another aspect, alone or in combination with any other aspect, the mounting member can be configured to receive a horn switch plate for sliding movement along an outer surface of the mounting member. The apparatus can further include a spring that biases the horn switch plate away from the steering wheel structure. The horn switch plate can be configured to slide along the outer surface of the mounting member against a spring bias in response to displacement of the airbag module displacement resulting from pressure applied to an airbag module cover.

According to another aspect, alone or in combination with any other aspect, the horn switch plate can include an opening and a mounting ring fixed to the horn switch plate along a periphery of the opening. The mounting ring can encircle the outer surface of the mounting member and can be constructed of a material that promotes the mounting ring sliding along the outer surface of the mounting member.

According to another aspect, alone or in combination with any other aspect, the mounting member can be configured to receive a horn ring that encircles the outer surface of the mounting member. The spring can bias the horn ring and switch plate away from each other, and wherein the mounting member comprises features that support the horn ring and switch plate against movement away from each other due to the bias of the spring.

According to another aspect, alone or in combination with any other aspect, the horn ring can support a first horn contact spaced axially from a second horn contact. The coupling device can be configured so that axial movement of the switch plate toward the horn ring against the spring bias causes the first and second horn contacts to contact each other.

According to another aspect, alone or in combination with any other aspect, the screw can include a spacer portion that engages the steering wheel structure when the screw is fully tightened. The damping element can have an axial length about equal to the axial length of the spacer portion so that the damping element engages a screw head at an upper end and engages the steering wheel structure at a lower end. The damping element can include a surface feature that engages a surface feature of the mounting member to support the mounting member on the steering wheel structure so that the mounting member is free from contact with the steering wheel structure and free from contact with the screw.

According to another aspect, alone or in combination with any other aspect, the screw and the damping element can be the only components of the coupling device that contact the steering wheel structure.

According to another aspect, a subassembly can include a steering wheel structure, an airbag module, and an apparatus according to any of the aspect set forth above.

According to another aspect, a coupling device for mounting an airbag module to be oscillating on a steering wheel structure of a vehicle steering wheel includes a mounting member having an axial bottom side relative to a steering wheel axis which in the assembled state of the vehicle steering wheel faces the steering wheel structure as well as an opposite axial top side which in the assembled state of the vehicle steering wheel faces the airbag module. A contact face is provided on the axial bottom side for a damping element for oscillating coupling of the mounting member to the steering wheel structure. A locking element is disposed on the top side of the mounting member for locking with the airbag module. The locking element is configured so that the airbag module can be coupled to the mounting member by a locking connection substantially in an axially fixed manner or in an axially restrictedly movable manner.

According to another aspect, alone or in combination with any other aspect, the mounting member can be a mounting plate which extends substantially perpendicularly to the steering wheel axis A and especially includes plural locking elements.

According to another aspect, alone or in combination with any other aspect, plural locking elements can be provided and a damping element can be associated with each locking element, wherein the locking elements and the associated damping elements are arranged axially in series.

According to another aspect, alone or in combination with any other aspect, on the axial top side of the mounting member a horn contact or an actuating element for activating a beep can be arranged and the locking element can be configured so that the airbag module can be coupled to the mounting member by the locking connection in an axially restrictedly movable manner.

According to another aspect, alone or in combination with any other aspect, the coupling device can include a damping element which contacts the contact face on the axial bottom side of the mounting member and couples the mounting member to the steering wheel structure in an oscillating manner so that the mounting member and the steering wheel structure are movable relative to each other at least transversely to the steering wheel axis A. The damping element can especially be preassembled on the axial bottom side of the mounting member.

According to another aspect, alone or in combination with any other aspect, the damping element can extend through an opening of the mounting member.

According to another aspect, alone or in combination with any other aspect, the damping element can include an annular vibration-damping material having a radial shoulder, wherein an edge of the opening forms a contact face and acts on the radial shoulder of the vibration-damping material.

According to another aspect, alone or in combination with any other aspect, the radial shoulder can be configured as a groove in the vibration-damping material, wherein the edge of the mounting member opening at least in portions engages in the groove.

According to another aspect, a subassembly can include a steering wheel structure, a coupling device according to any of the preceding aspects, and a screw for mounting the coupling device on the steering wheel structure which screw extends through the annular vibration-damping material. The vibration-damping material with an axial end face can be adjacent at least in portions to a screw head of the screw and/or with an opposite axial end face is adjacent at least in portions to the steering wheel structure.

According to another aspect, a subassembly can include a steering wheel structure, a coupling device according to any of the preceding aspects, and a damping element for oscillating coupling of the mounting member to the steering wheel structure. The damping element can be arranged on the axial bottom side of the mounting member and is preassembled together with the mounting member on the steering wheel structure.

According to another aspect, a subassembly can include a prefabricated airbag module and a coupling device according to any of the preceding aspects. The prefabricated airbag module can include a module cover including a horn contact as well as another module component including a mating contact axially abutting on the horn contact, with the module cover being supported to be axially movable relative to the further module component for activating a beep.

According to another aspect, a subassembly can include a prefabricated airbag module and a coupling device according to any of the preceding aspects. The prefabricated airbag module can include a mating contact axially abutting on the horn contact, with the airbag module being supported to be axially movable relative to the mounting member for activating a beep.

According to another aspect, a vehicle steering wheel of an automotive vehicle can include a steering wheel structure, a prefabricated airbag module, a coupling device according to any of the preceding aspects, and a damping element for oscillating coupling of the mounting member to the steering wheel structure. The vehicle steering wheel can include a horn contact as well as a mating contact axially abutting on the horn contact. Both the horn contact and the mating contact can be formed on components of the vehicle steering wheel that are supported so as to be oscillating.

According to another aspect, alone or in combination with any other aspect, the airbag module can be secured to the steering wheel structure exclusively by the locking connection to the coupling device.

According to another aspect, alone or in combination with any other aspect, the airbag module can be secured to the steering wheel structure by means of the coupling device. Moreover, another connection independent of the coupling device can be provided between the airbag module and the steering wheel structure.

According to another aspect, alone or in combination with any other aspect, a coupling device for mounting an airbag module on a steering wheel structure of a vehicle steering wheel includes a mounting member including a sleeve having a central opening and being connected to the airbag module. A damping element constructed of a vibration damping material is positioned in the sleeve and connected to the sleeve. A spring encircles an outer surface of the mounting member. A fastening structure extends through the mounting member, damping element, and spring. The fastening structure connects the coupling device to the steering wheel structure. The mounting member is configured to receive a horn switch plate for sliding movement along the outer surface of the mounting member. The spring exerts a spring bias against the horn switch plate and the mounting member in opposite directions, which biases the horn switch plate away from the steering wheel structure.

According to another aspect, alone or in combination with any other aspect, the horn switch plate can be connected to and at least partially supports the airbag module. The horn switch plate can be configured to slide along the outer surface of the mounting member against the spring bias in response to displacement of the airbag module resulting from pressure applied to an airbag module cover.

According to another aspect, alone or in combination with any other aspect, the damping element completely isolates the airbag module from the steering wheel structure.

According to another aspect, alone or in combination with any other aspect, the horn switch plate can include an opening and a mounting ring fixed to the horn switch plate along a periphery of the opening. The the mounting ring encircles the outer surface of the mounting member and is constructed of a material that promotes the mounting ring sliding along the outer surface of the mounting member.

According to another aspect, alone or in combination with any other aspect, the mounting member supports a first horn contact spaced axially from a second horn contact. The coupling device is configured so that axial movement of the switch plate against the spring bias causes the first and second horn contacts to contact each other.

According to another aspect, alone or in combination with any other aspect, the coupling device can include a plurality of mounting structures each having an associated damping element, spring, and fastening structure, and the coupling device further includes at least one bracket arm that interconnects the mounting structures.

According to another aspect, alone or in combination with any other aspect, each mounting member includes a tab that supports a first horn contact spaced axially from a second horn contact. The coupling device is configured so that axial movement of the switch plate against the spring bias causes the first and second horn contacts to contact each other.

According to another aspect, alone or in combination with any other aspect, the coupling device includes four mounting structures interconnected by three bracket arms that extend between the mounting members in a U-shaped manner.

According to another aspect, alone or in combination with any other aspect, the mounting member is configured to receive a horn ring that encircles the outer surface of the mounting member. The spring biases the horn ring and switch plate away from each other. The mounting member includes features that support the horn ring and switch plate against movement away from each other due to the bias of the spring.

According to another aspect, alone or in combination with any other aspect, the horn ring supports a first horn contact spaced axially from a second horn contact. The coupling device is configured so that axial movement of the switch plate toward the horn ring against the spring bias causes the first and second horn contacts to contact each other.

According to another aspect, alone or in combination with any other aspect, the damping element has a cylindrical configuration and is supported in the central opening of the sleeve. The fastening structure includes a screw that extends through a central opening of the damping element.

According to another aspect, alone or in combination with any other aspect, the damping element includes a surface feature that engages a surface feature of the mounting member to help maintain the connection between the damping element and the mounting member.

According to another aspect, alone or in combination with any other aspect, the damping element includes an upper end that engages a head of the fastening structure and a lower end that engages the steering wheel structure.

According to another aspect, alone or in combination with any other aspect, the fastening structure includes a screw comprising a spacer portion that engages the steering wheel structure when the screw is fully tightened. The damping element has an axial length about equal to the axial length of the spacer portion so that the damping element engages a screw head at an upper end and engages the steering wheel structure at a lower end. The damping element supports the mounting member on the steering wheel structure so that the mounting member is free from contact with the steering wheel structure and free from contact with the screw.

According to another aspect, alone or in combination with any other aspect, the damping element supports the mounting member on the steering wheel structure so that the mounting member is free from contact with the steering wheel structure and free from contact with the fastening structure.

According to another aspect, alone or in combination with any other aspect, the screw and the damping element are the only components of the coupling device that contact the steering wheel structure.

According to another aspect, alone or in combination with any other aspect, a subassembly includes a steering wheel structure, an airbag module, and a coupling device according to any of the preceding aspects.

DRAWINGS

Further features and advantages of the invention will be evident from the following description of preferred embodiments with reference to the drawings, in which.

DESCRIPTION

Figure 1:
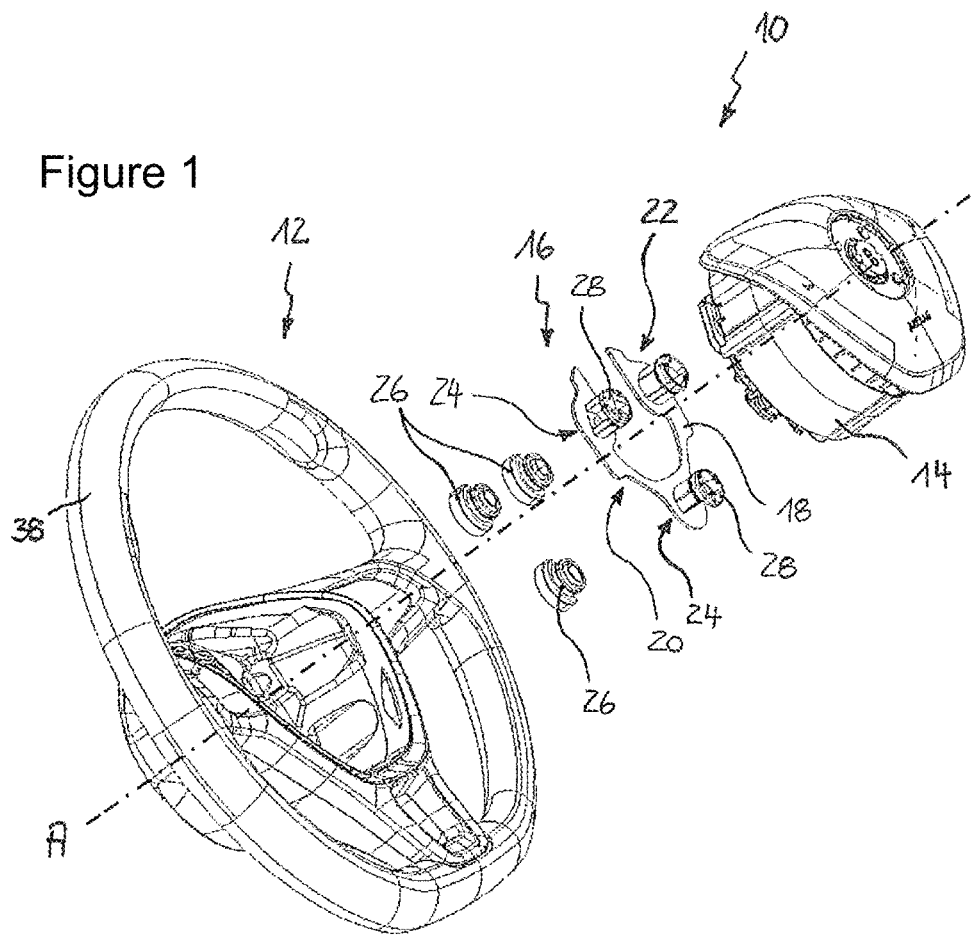
FIG. 1 shows a perspective exploded view of a vehicle steering wheel according to the invention comprising a coupling device according to the invention in accordance with one embodiment.

The coupling device 16 comprises a mounting member 18 including, relative to a steering wheel axis A, an axial bottom side 20 which in the assembled state of the vehicle steering wheel 10 faces the steering wheel structure 12 as well as an opposite axial top side 22 which in the assembled state of the vehicle steering wheel 10 faces the airbag module 14. On the axial bottom side 20 of the mounting member 18 a contact face 24 for a damping element 26 for oscillating coupling of the mounting member 18 to the steering wheel structure 12 is provided, whereas on the axial top side 22 at least one locking element 28 is arranged for locking with the airbag module 14.

The locking element 28 is configured so that the airbag module 14 can be coupled to the mounting member 18 by a locking connection substantially in an axially fixed manner or an axially restrictedly movable manner.

According to FIG. 1 the mounting member 18 is a mounting plate extending perpendicularly to the steering wheel axis A and including three locking elements 28. The mounting member 18 in this case is a metal part formed integrally with the locking elements 28, wherein the locking elements 28 are identically spaced apart from the steering wheel axis A and are arranged to be evenly spread in the circumferential direction. Alternatively, also configuration variants in which the mounting member 18 is made from robust plastic material are imaginable, however.

The coupling device 16 in the shown embodiment includes three damping elements 26 each of which is adjacent to a contact face 24 on the axial bottom side 20 of the mounting plate.

According to FIG. 1, a damping element 26 is associated with each locking element 28, wherein the locking elements 28 and the associated damping elements 26 are arranged axially in series.

Figure 2:
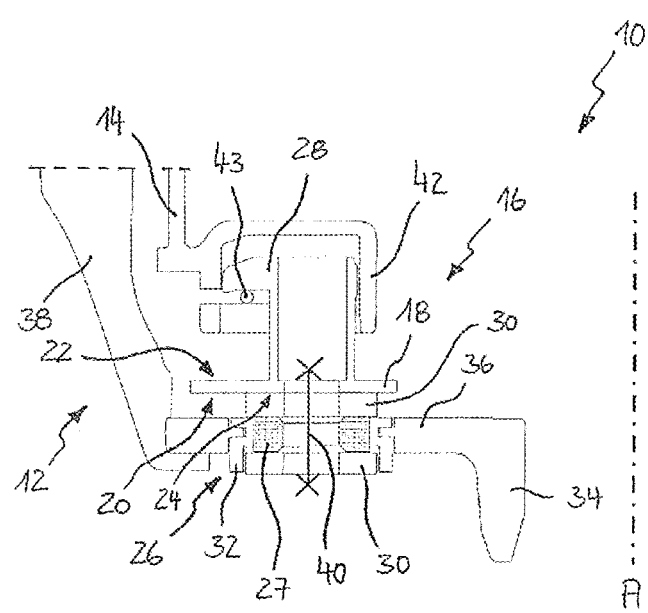
FIG. 2 shows a schematic detailed section across the steering wheel according to FIG. 1 in the area of a locking element of the coupling device.

FIG. 2 illustrates a detailed section across the vehicle steering wheel 10 according to FIG. 1 in the area of a damping element 26 and the associated locking element 28 thereof.

The damping element 26 in this case comprises a vibration-damping material 27, for example an elastomer, as well as two stop elements 30 and a mounting sleeve 32, each abutting on the vibration-damping material 27. The stop elements 30 are arranged axially on both sides of the vibration-damping material 27, while the mounting sleeve 32 extends axially between the stop elements 30.

The steering wheel structure 12 generally comprises a steering wheel armature having a steering wheel rim, at least one spoke as well as a hub 34 and a hub plate 36. Moreover, the steering wheel structure 12 usually further comprises a foam coating 38, for example made from polyurethane, which at least partially surrounds the steering wheel armature.

According to FIG. 2, the damping element 26 is secured to the steering wheel armature via the mounting sleeve 32, with the mounting sleeve 32 and the hub plate 36 forming a bayonet joint, for example.

It is further evident that the mounting member 18 including the integrally formed locking element 28 is connected to the damping element 26 by a screw 40 and to the steering wheel armature via the damping element 26 in this case.

The vibration-damping material 27 may be connected already in advance, e.g. by vulcanizing, to the mounting sleeve 32 and the stop elements 30 so as to constitute the prefabricated damping element 26 with the latter. Then the mounting sleeve 32 of each individual damping element 26 is secured to the steering wheel structure 12, concretely to the hub plate 36 of the steering wheel structure 12, in the way of a bayonet lock. Finally, the mounting member 18 including its integrally formed locking elements 28 is inserted and connected to the individual damping elements 26 by the screws 40.

As will be exemplified later by way of FIG. 4, as a matter of course also alternatives for securing the coupling device 16 to the steering wheel structure 12 are imaginable, however.

At any rate, in this way a subassembly comprising the steering wheel structure 12, the afore-described coupling device 16 and at least one damping element 26 for oscillating coupling of the mounting member 18 to the steering wheel structure 12 is resulting, with the at least one damping element 26 being arranged on the axial bottom side 20 of the mounting member 18 and being preassembled together with the mounting member 18 on the steering wheel structure 12.

According to FIGS. 1 and 2, the locking elements 28 of the coupling device 16 are rigid detent hooks which upon axially attaching the prefabricated airbag module 14 immerse in module bushes 42 and lock with a spring wire 43 mounted on the airbag module 14.

Figure 3:
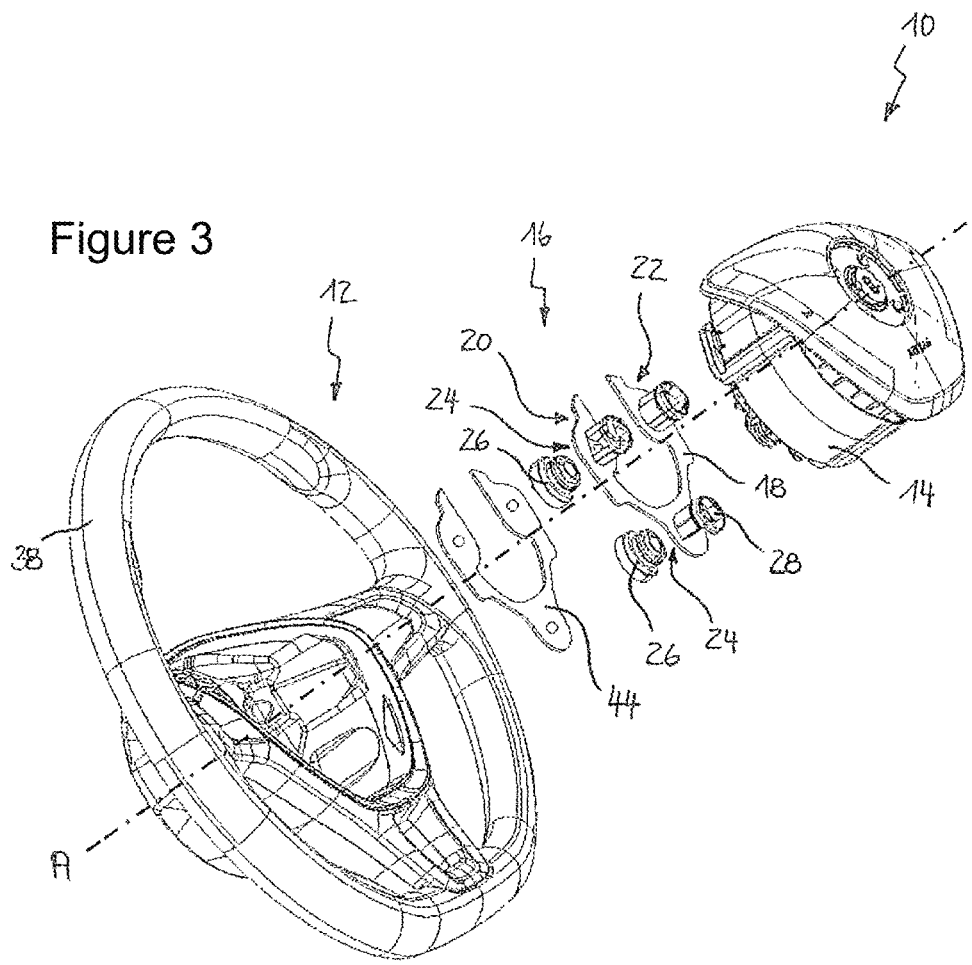
FIG. 3 shows a perspective exploded view of a vehicle steering wheel according to the invention comprising a coupling device according to the invention in accordance with another embodiment.

FIG. 3 illustrates a vehicle steering wheel 10 which differs from the steering wheel design of FIG. 1 merely by a different configuration of the coupling device 16. In order to avoid repetitions, therefore the foregoing description is generally referred to and, in the following, mainly differences shall be discussed.

As compared to the embodiment according to FIG. 1, the coupling device 16 according to FIG. 3 includes a different mounting on the steering wheel structure 12 which is especially advantageous as regards the assembling effort. Instead of the stop elements 30 and the mounting sleeves 32, the coupling device 16 includes a base plate 44 for assembling the mounting member 18 on the steering wheel structure 12.

The vibration-damping material 27 in this case forms the damping element 26 and can be connected, for example by vulcanizing, already in advance to the mounting member 18 and the base plate 44 so that the damping element 26 is part of the prefabricated coupling device 16.

Figure 4:
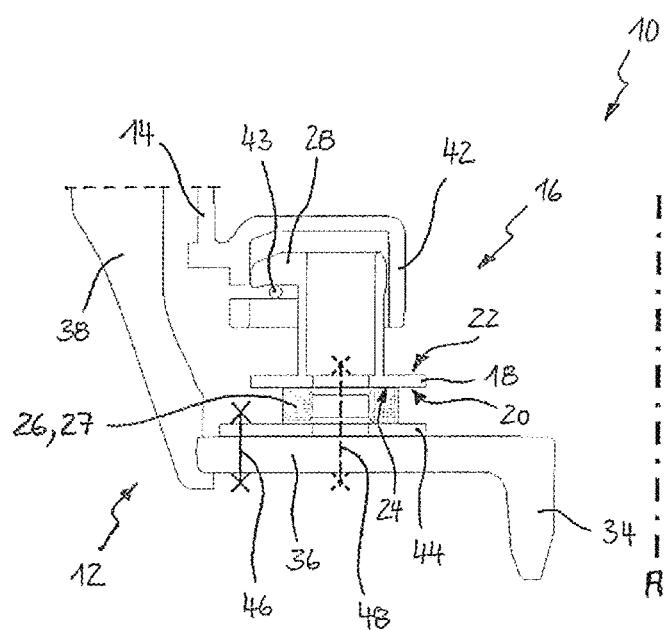
FIG. 4 shows a schematic detailed section across the steering wheel according to FIG. 3 in the area of a locking element of the coupling device.

By way of the detailed section according to FIG. 4, it becomes evident that the base plate 44 of the coupling device 16 then only has to be secured to the steering wheel structure 12, wherein the base plate 44 in the present embodiment is concretely screwed to the hub plate 36 of the steering wheel structure 12 by a screw 46.

For further reducing the assembling effort for the coupling device 16, alternatively or additionally to screwing it is also imaginable to foam the base plate 44 at least on the edge side into the foam coating 38 and thus to secure it to the steering wheel structure 12.

In order to prevent the airbag module 14 when being activated from completely detaching from the steering wheel structure 12, directly on the steering wheel structure 12 catch elements may be provided which during normal driving are spaced apart from the airbag module 14 and only when the module is activated act immediately on the airbag module 14 and withhold the module 14. Said catch elements are, for example, catch hooks or stop hooks 80 integrally formed on the steering wheel armature of the steering wheel structure 12 (cf. FIG. 12).

According to a specific variant of the vehicle steering wheel 10 such catch elements are not provided. The airbag module 14 in that case is secured to the steering wheel structure 12 exclusively via the coupling device 16. In order to fix the locking element 28 of the coupling device 16 especially tightly and reliably on the steering wheel structure 12 in this case, a screw 48 indicated in broken lines in FIG. 4 is provided alternatively or additionally to the screw 46.

As regards a horn function of the steering wheel 10, it is especially advantageous when the vehicle steering wheel 10 includes a horn contact 50 as well as a mating contact 52 axially abutting on the horn contact 50, wherein both the horn contact 50 and the mating contact 52 are formed at components of the vehicle steering wheel 10 that are supported to be oscillating.

Components supported to be oscillating in this context are, for example, the mounting member 18 of the coupling device 16 as well as the airbag module 14 including all of its module components.

Figure 5:
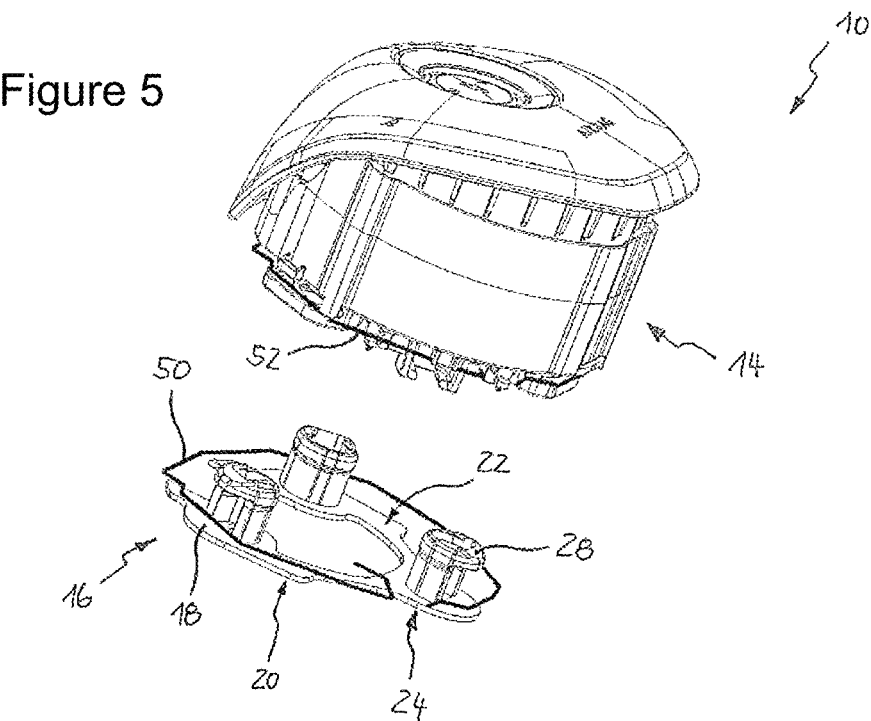
FIG. 5 shows a perspective view of a subassembly according to the invention for a vehicle steering wheel comprising a coupling device according to the invention in accordance with one embodiment.
Figure 6:
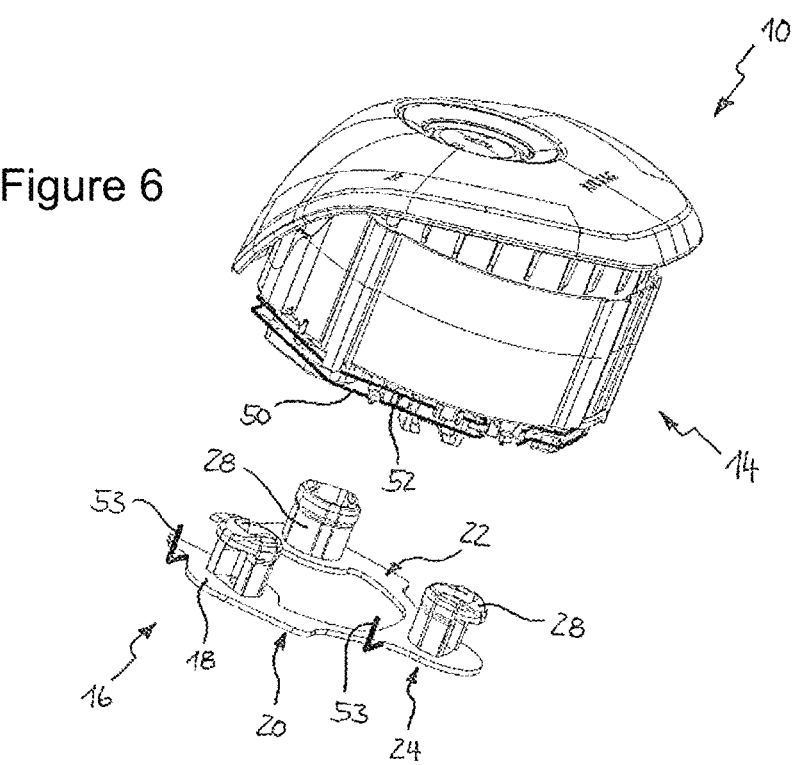
FIG. 6 shows a perspective view of a subassembly according to the invention for a vehicle steering wheel comprising a coupling device according to the invention in accordance with another embodiment.
Figure 7:
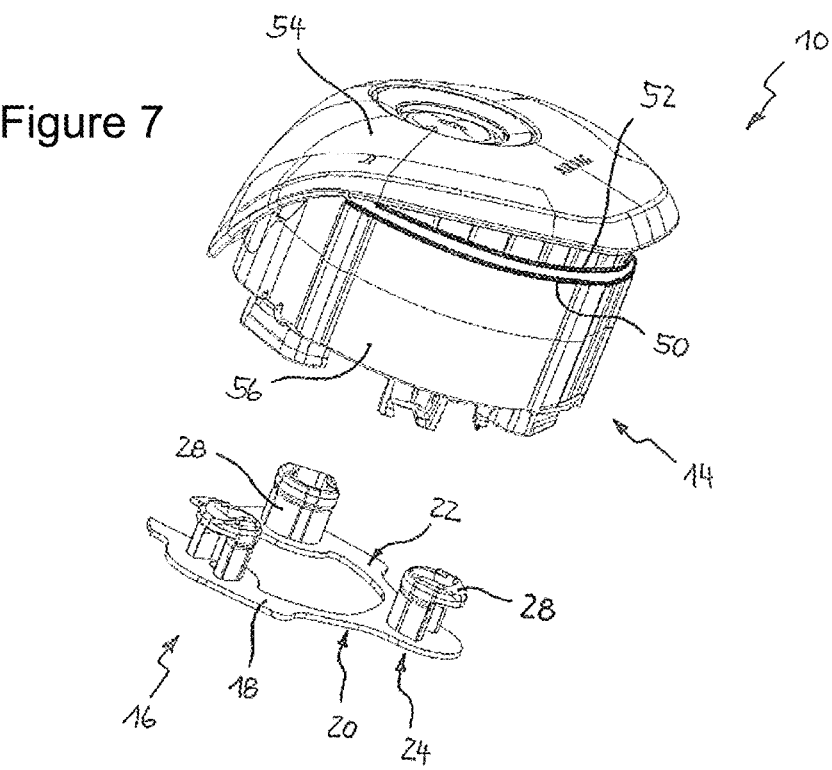
FIG. 7 shows a perspective view of a subassembly according to the invention for a vehicle steering wheel comprising a coupling device according to the invention in accordance with yet another embodiment.

In FIGS. 5 to 7 various options for realizing such horn function on the vehicle steering wheel 10 are exemplified.

FIG. 5 illustrates a subassembly for the vehicle steering wheel 10 comprising a prefabricated airbag module 14 and a coupling device 16 which has a horn contact 50 for activating a beep on the top side 22 of the mounting member 18.

The airbag module 14 includes a mating contact 52 axially abutting on the horn contact 50, wherein the (entire) airbag module 14 is supported to be axially movable relative to the mounting member 18 for activating the beep. In other words, the prefabricated airbag module 14 hence is coupled to the mounting member 18 to be axially restrictedly movable in the assembled state of the vehicle steering wheel 10 via the locking connection to the locking elements 28 of the coupling device 16.

FIG. 6 illustrates another subassembly for the vehicle steering wheel 10 which differs from the embodiment according to FIG. 5 merely by the fact that the airbag module 14 includes both the horn contact 50 and the mating contact 52 axially spaced apart from the horn contact 50. The mounting member 18 supported to be oscillating includes at least one axially projecting actuating element 53 being axially abutting on the horn contact 50, wherein two hook-shaped projections are provided as actuating elements 53 in the shown variant. For activating the horn, the (entire) airbag module 14 then is moved axially in the direction of the mounting member 18 against a spring force, with the horn contact 50 being deformed or displaced in the direction of the mating contact 52 by the at least one actuating element 53 until the desired beep sounds when the contacts will touch each other.

Finally, FIG. 7 shows another embodiment of the subassembly for the vehicle steering wheel 10 comprising a prefabricated airbag module 14 and a coupling device 16, with the horn function being integrated in the airbag module 14. The prefabricated airbag module 14 in this case includes a module cover 54 having the horn contact 50 and another module component 56 having the mating contact 52 axially abutting on the horn contact 50, wherein the module cover 54 is supported to be axially movable relative to the further module component 56 for activating the beep.

As compared to the configuration variants according to FIGS. 5 and 6, hence a horn activation according to FIG. 7 is not effectuated by displacing the entire airbag module 14 but by a relative movement between the module cover 54 and the further module component 56, for example a module casing.

However, all configuration variants share the fact that all components required for horn activation such as horn contacts 50, mating contacts 52 and/or actuating elements 53 are supported to be oscillating on the steering wheel structure 12. In other words, in a vehicle steering wheel 10 including a vibration damper all of the components required for activating the horn are part of the damper mass of the steering wheel vibration damper.

This is also applicable to the further embodiment of the coupling device 16 shown in FIGS. 8 to 13 in which the damping element 26 extends through an opening 58 of the mounting member 18.

In the present embodiment, the damping element 26 is made from the vibration-damping material 27 that is annular and has a radial shoulder on the outside. The mounting member opening 58 has an opening edge including radially inwardly protruding projections 60, 62 which form the contact face 24 for the damping element 26 and act on the radial shoulder of the vibration-damping material 27.

Figure 11:
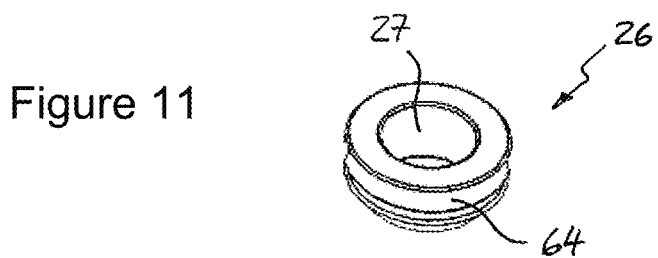
FIG. 11 shows a perspective bottom view of a damping element for the coupling device according to the invention in accordance with FIG. 10.

The radial shoulder in the vibration-damping material 27 is a peripheral groove 64 according to FIG. 11, with the opening edge, concretely the projections 60 of the opening edge engaging in the groove 64. In this way, the elastic ring made from vibration-damping material 27 can be quickly and easily attached to the opening 58 so that the damping element 26 is axially positioned and fixed on the mounting member 18 with minimum effort. Each projection 60 of the mounting member 18 includes an axial bottom side 20 facing the steering wheel structure 12 and forms a contact face 24 for the damping element 26 which in the present case corresponds to the annular vibration-damping material 27.

Figure 8:
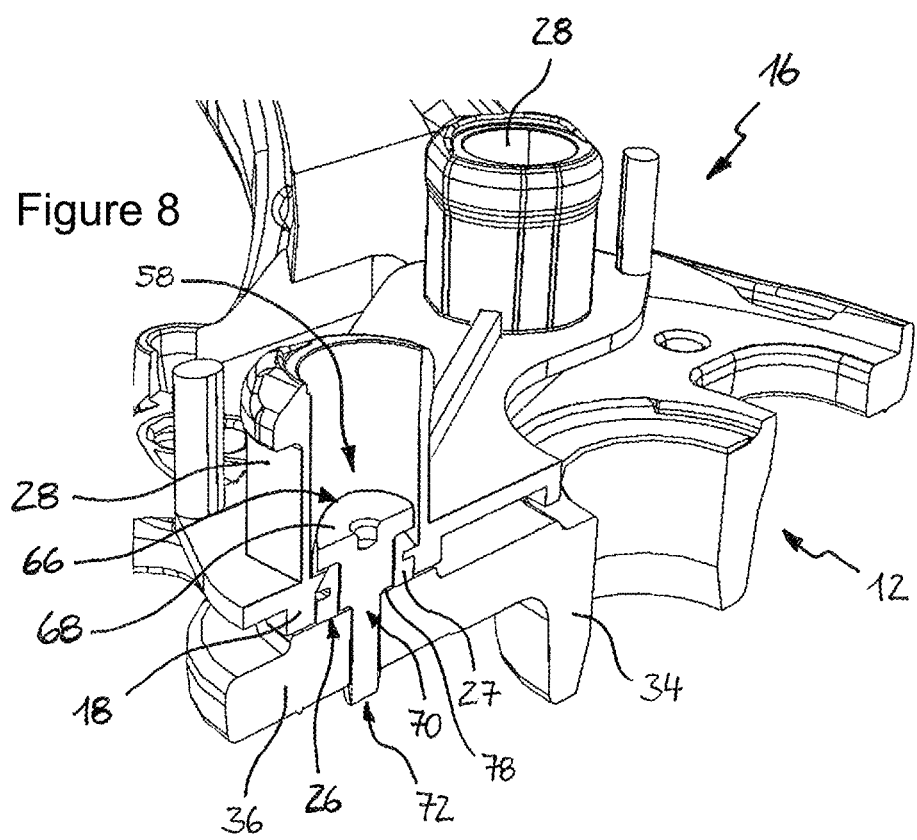
FIG. 8 shows a perspective view of a subassembly according to the invention for a vehicle steering wheel comprising a coupling device according to the invention in accordance with yet another embodiment.
Figure 9:
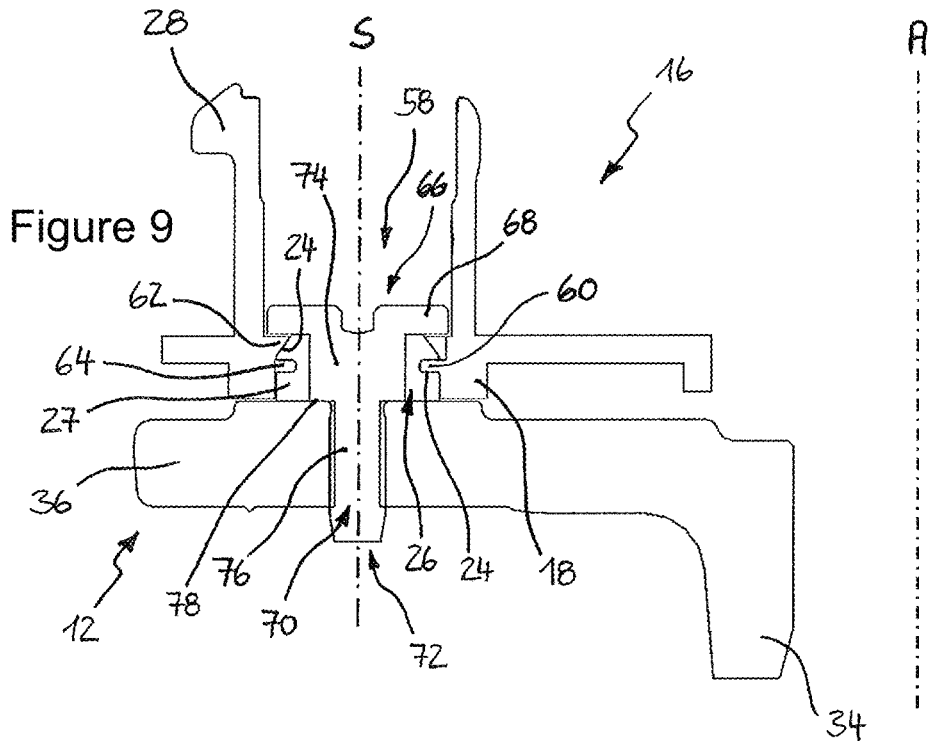
FIG. 9 shows a detailed section across the subassembly according to FIG. 8 in the area of a mounting member of the coupling device according to the invention.
Figure 10:
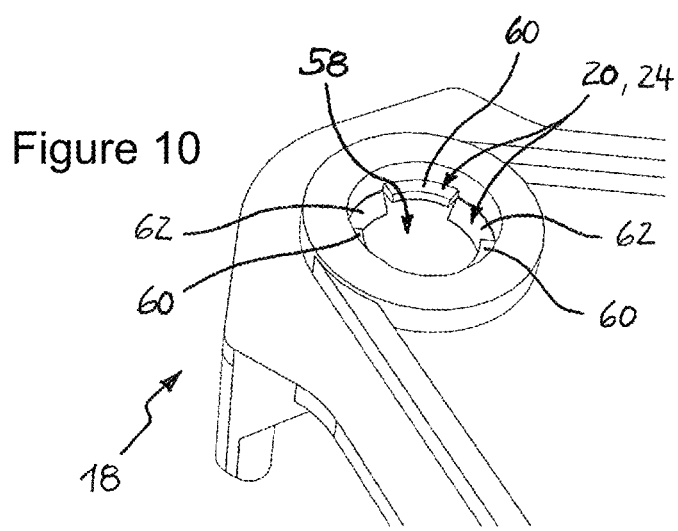
FIG. 10 shows a perspective bottom view of the coupling device according to the invention in accordance with FIG. 9 in the area of the mounting member.

FIGS. 8 and 9 illustrate a subassembly comprising a steering wheel structure 12, a coupling device 16 and a screw 66 for assembling the coupling device 16 on the steering wheel structure 12, with the screw 66 extending through the annular vibration-damping material 27.

With respect to a screw axis S the screw 66 extends from a screw head 68 in the axial direction via a screw shank 70 to a free shank end 72. The screw shank 70 is stepped having a spacer portion 74 abutting on the screw head 68 and a thread portion 76 abutting on the spacer portion 74 toward the free shank end 72, which thread portion is separated from the spacer portion 74 by a step 78. The thread portion 76 has a smaller shank diameter than the spacer portion 74 and is screwed into the hub plate 36 of the steering wheel structure 12 until the step 78 contacts the hub plate 36 and prevents further screwing.

The locking element 28 extends in the axial direction from the mounting member 18 to a free end and is substantially hollow-cylindrical, with a locking projection being integrally formed at the free end. An outer diameter of the screw head 68 is somewhat smaller than an inner diameter of the locking element 28 so that the screw 66 can be inserted into the locking element 28 and extends through the opening 58 of the mounting member 18 into the hub plate 36. Said screwing of the mounting member 18 in the area of the locking element 28 contributes to an especially compact design of the coupling device 16.

According to FIG. 9, an axial dimension of the spacer portion 74 of the screw 66 is somewhat larger than an axial dimension of the mounting member 18 in the area of the damping element 26 so that a predetermined movement of the mounting member 18 relative to the steering wheel structure 12 is possible for vibration damping.

An axial dimension of the damping element 26 is at least as large as the axial dimension of the spacer portion 74 so that the vibration-damping material 27 is axially positioned as well as preferably slightly compressed when the screw 66 is tightened.

The groove 64 in the vibration-damping material 27 is disposed so that in a non-excited idle position of the vehicle steering wheel 10, the mounting member 18 is held to be axially spaced apart from the screw head 68 and the hub plate 36, especially substantially axially centrally between the screw head 68 and the hub plate 36, via its projections 60 engaging in the groove 64.

Just as the projections 60, also the projections 62 of the mounting member 18 axially abutting on the screw head 68 have axial bottom sides 20 facing the steering wheel structure 12 each of which forms a contact face 24 for the damping element 26. Primarily the projections 62 serve as stops of the mounting member 18 on the screw head 68, however, so as to define a maximum relative movement between the mounting member 18 and the steering wheel structure 12.

The vibration-damping material 27 is adjacent with an axial end face at least in portions to the screw head 68 of the screw 66 and is adjacent with an opposite axial end face at least in portions to the steering wheel structure 12.

Thus, an accommodating space for the vibration-damping material 27 is defined in the axial direction by the screw head 68 and the steering wheel structure 12 as well as in the radial direction by the spacer portion 74 of the screw shank 70 and the mounting member 18. Therefore, separate stop elements 30 and mounting sleeves 32 (as shown in FIG. 2, for example) can advantageously be dispensed with.

If exceptionally high forces, as they occur e.g. upon activation of the airbag module 14, cannot be transmitted by the connection between the airbag module 14 and the coupling device 16 and/or by the connection between the coupling device 16 and the steering wheel structure 12, it is imaginable that the airbag module 14 is not only secured to the steering wheel structure 12 by means of the coupling device 16 but that moreover a further connection between the airbag module 14 and the steering wheel structure 12 independent of the coupling device 16 is provided.

Figure 12:
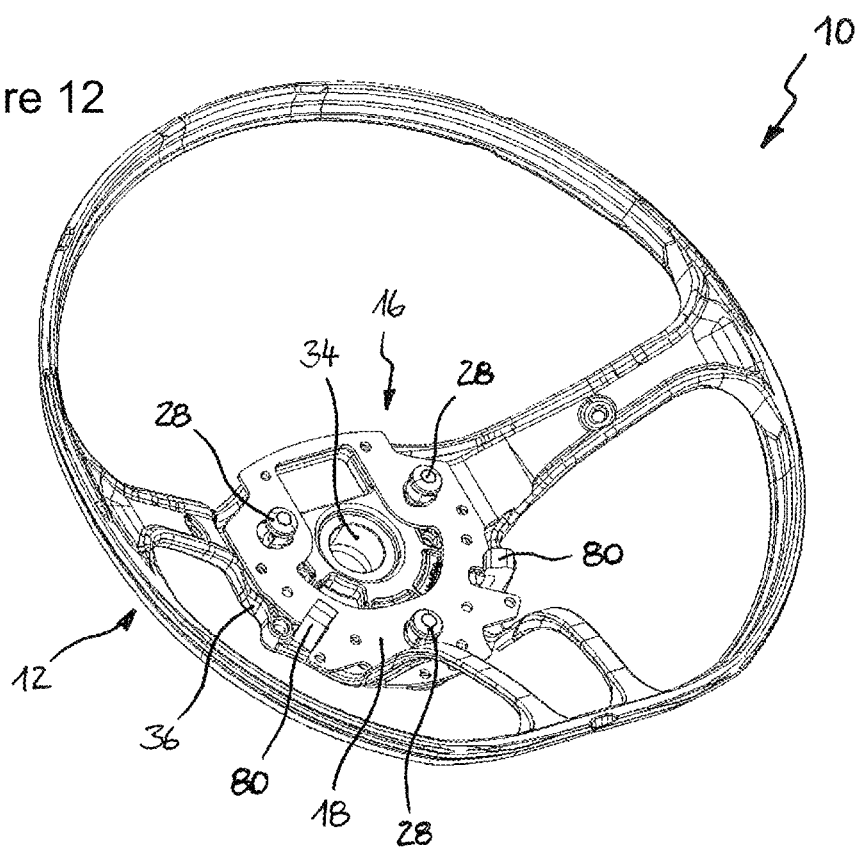
FIG. 12 shows a perspective view of a vehicle steering wheel comprising a coupling device according to the invention.

This is illustrated, for example, in a vehicle steering wheel 10 according to FIG. 12. In the shown steering wheel design, a coupling device 16 and a steering wheel structure 12 are provided, wherein a mounting member 18 of the coupling device 16 in the form of a mounting plate is connected to the steering wheel structure 12 in an oscillating manner and includes locking elements 28 for locking with the airbag module 14. Furthermore, at the steering wheel structure 12 there are provided catch elements which during normal driving are spaced apart from the airbag module 14 and only upon activation of the module act immediately on the airbag module 14 and withhold the same. According to FIG. 12, said catch elements are detent hooks 80 integrally formed on the steering wheel armature of the steering wheel structure 12.

Figure 13:
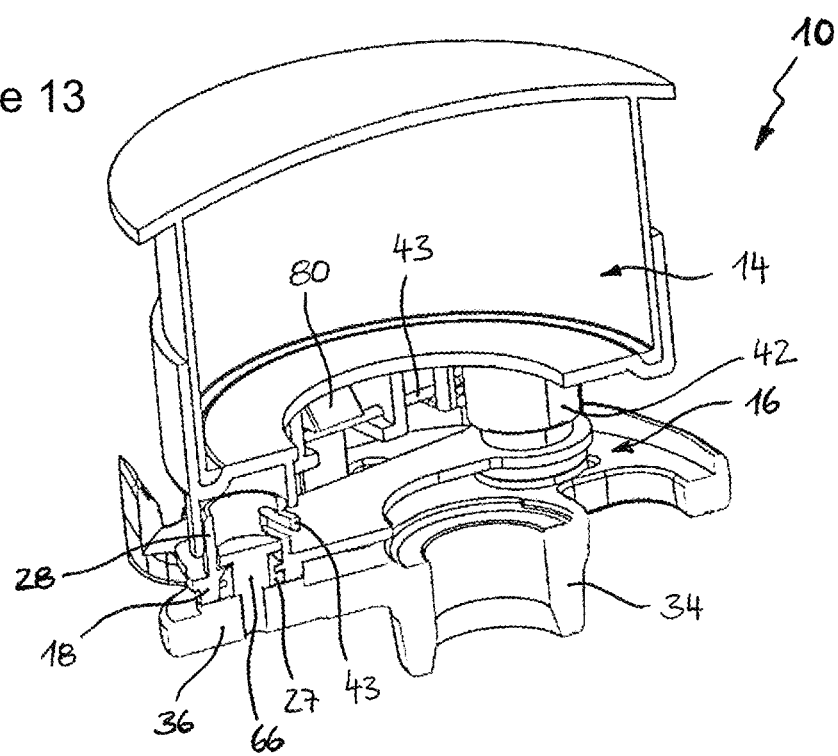
FIG. 13 shows a sectional view of a vehicle steering wheel according to the invention comprising a subassembly in accordance with FIG. 8 and an assembled airbag module.

FIG. 13 illustrates the vehicle steering wheel 10 according to FIG. 12 with a coupling device 16 according to FIG. 9 and an assembled airbag module 14. Herefrom it is evident that the spring wire 43 tightly connected to the airbag module 14 engages both in the locking elements 28 of the coupling device 16 and in the detent hooks 80 of the steering wheel structure 12.

A further embodiment of the coupling device 16 shown in FIGS. 14-17. In this embodiment, as with other embodiments, the coupling device 16 includes a vibration damping element 26 that extends through an opening 58 of the mounting member 18.

Figure 14:
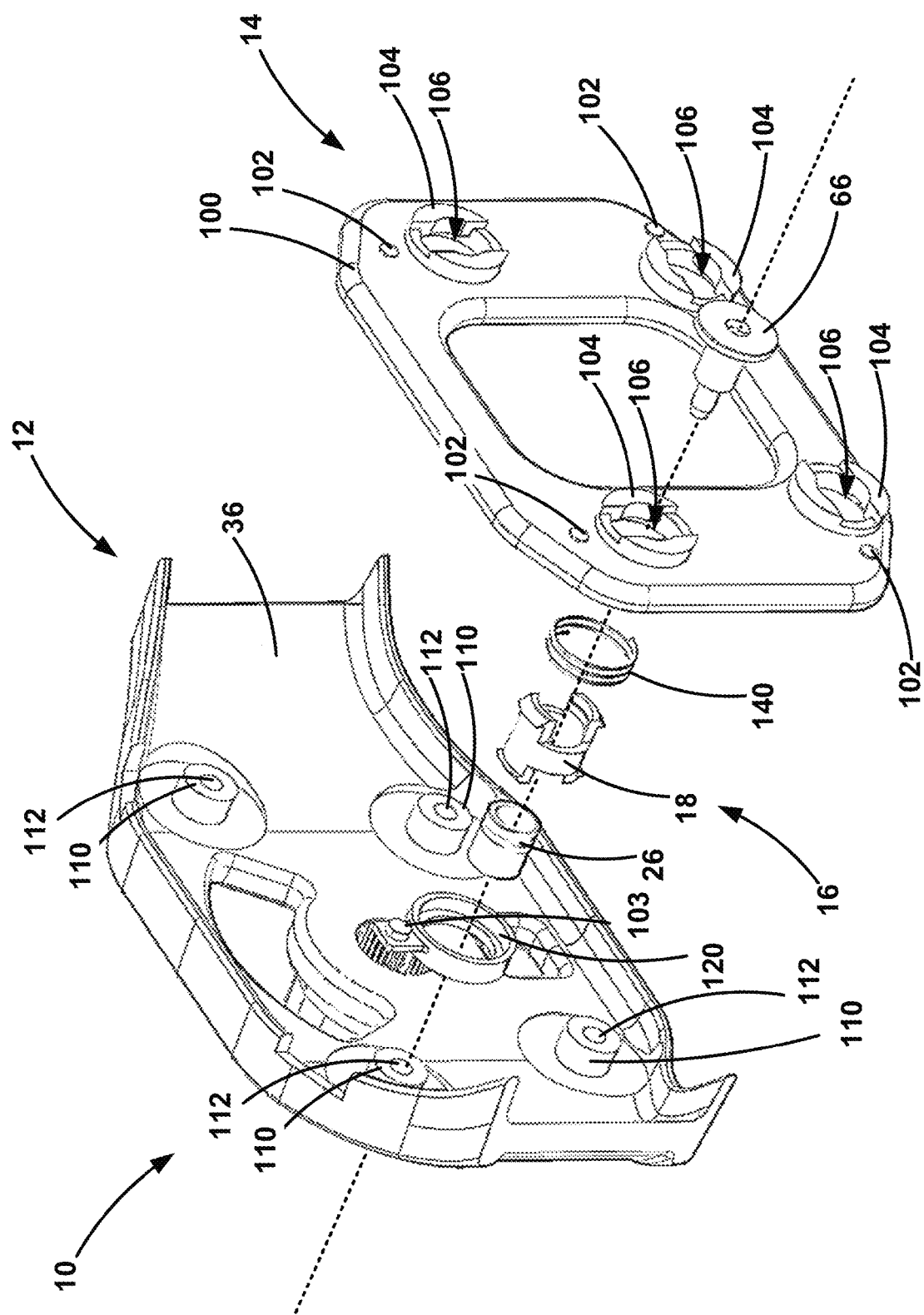
FIG. 14 is an exploded perspective view of a vehicle steering wheel including a coupling device for connecting an airbag module to the steering wheel structure, according to another example configuration.

FIG. 14 is an exploded view illustrating how the coupling device 16 interfaces with the steering wheel structure 12 and the airbag module 14. More specifically, the coupling device 16 connects a horn switch plate 100 to the hub plate 36 of the steering wheel structure 12. To facilitate this connection, the hub plate 36 includes cylindrical mounting projections 110 each of which includes a threaded central opening 112. The switch plate 100 can be a portion of the airbag module 14 or can be a separate component connectable with the airbag module.

The switch plate 100 can be constructed of metal and over-molded with a plastic or elastomeric material. The switch plate 100 includes horn contacts 102, such as rivets, that form part of a horn actuation circuit. The switch plate 100 also includes mounting openings 104 in which mounting rings 106 are fixed. In the configuration illustrated in FIG. 14, there are four horn contacts 102, each of which is positioned adjacent to a corresponding mounting opening 104/mounting ring 106 combination. The mounting rings 106 and their respective mounting openings 104 are arranged and spaced on the switch plate 100 to correspond to the arrangement and spacing of the mounting projections 110 and their respective openings 112 on the hub plate 36.

As with other embodiments disclosed herein, the coupling device 16 includes a mounting member 18, a damping element 26, and a shoulder screw 66. Additionally, the coupling device 16 includes a horn ring 120 and a spring 140.

Figure 15:
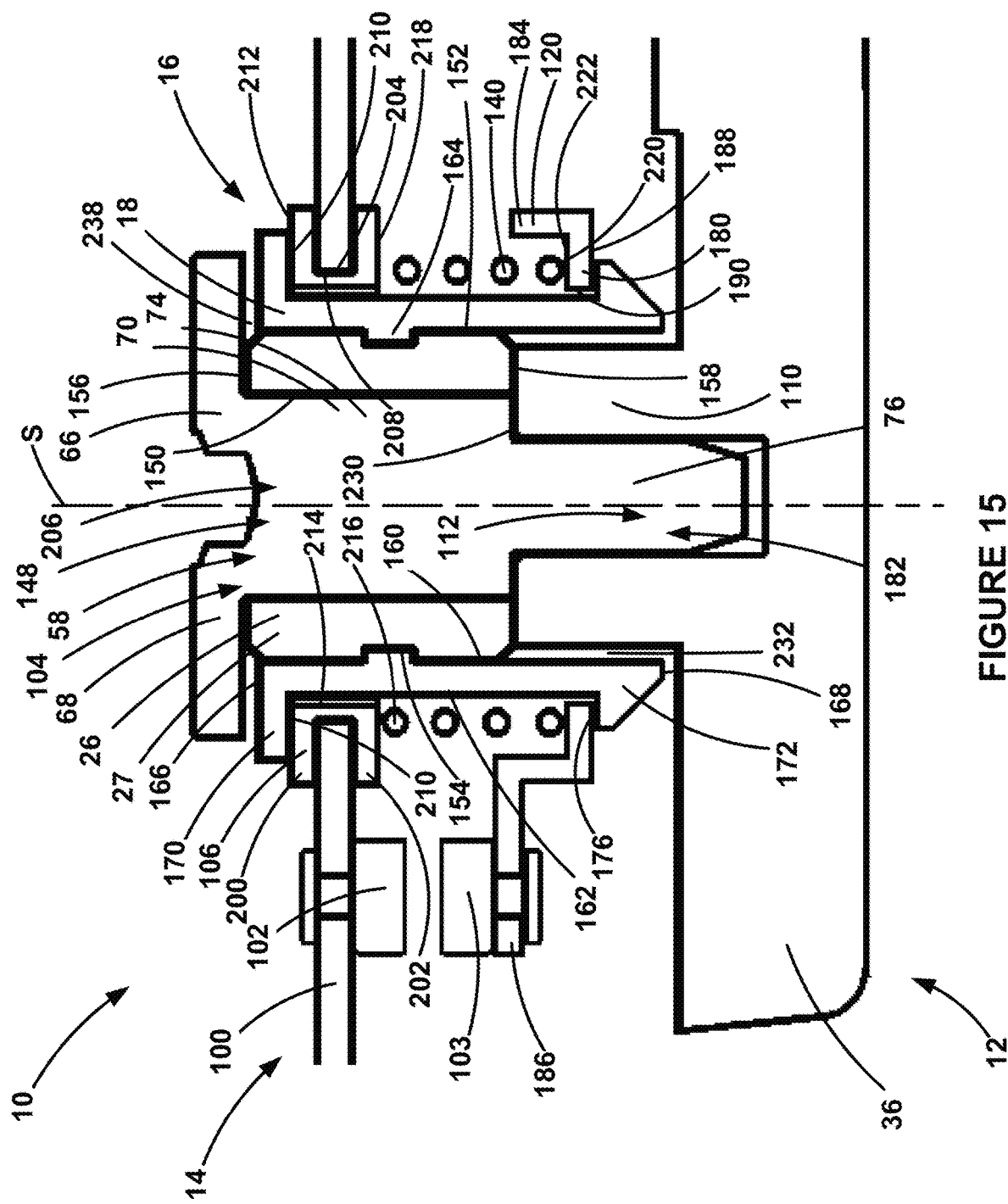
FIGS. 15 and 16 are sectional views of the steering wheel of FIG. 14, illustrating the components in different conditions.
Figure 16:
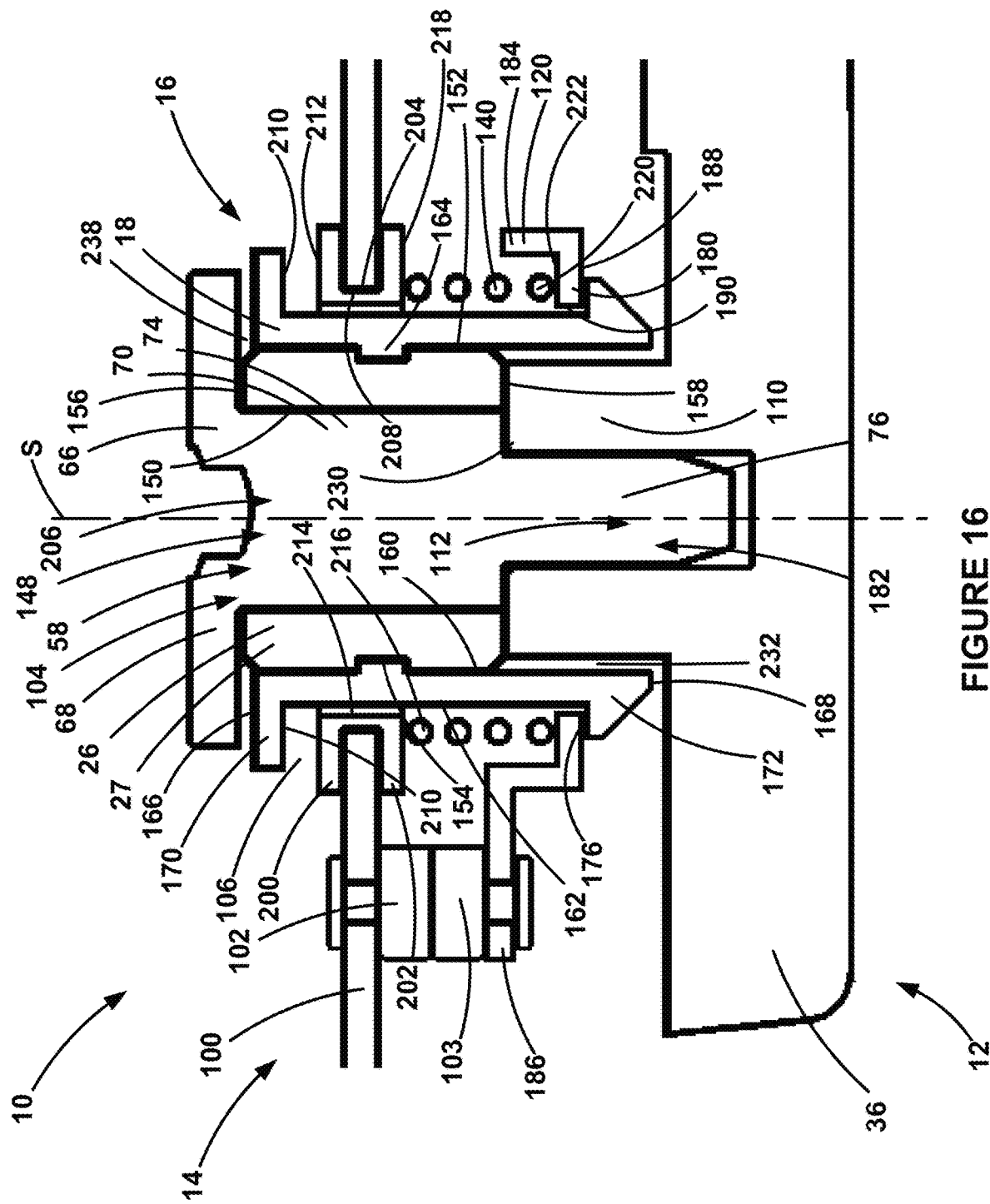

Referring to FIGS. 15-16, the damping element 26 is made from vibration-damping material 27 and has a generally cylindrical configuration including a central cylindrical inner surface 150 defining a central opening 148. The damping element 26 also includes a cylindrical outer surface 152 and a surface feature in the form of an annular groove 154 that extends into the outer surface and has a generally rectangular profile. The damping element 26 further includes upper and lower (as viewed in the figures) axial end surfaces 156, 158, respectively.

The vibration-damping material 27 is a deformable and resilient material, such as an elastomer (i.e., a natural or synthetic polymer having elastic properties, e.g., rubber).

The mounting member 18 has a generally cylindrical configuration in the form of a sleeve that includes a central cylindrical inner surface 160 that defines the central opening 58 that extends through the mounting member. The mounting member 18 also includes a cylindrical outer surface 162 and a surface feature in the form of an annular projection 164 that extends outward from the inner surface into the central opening 58 and has a generally rectangular profile. The mounting member 18 also includes upper and lower axial end surfaces 166, 168, respectively. The mounting member 18 further includes an upper flange 170 and a lower locking element 172 that project radially outward from the upper and lower ends, respectively, of the mounting member.

The damping element 26 is positioned in the central opening 58 of the mounting member 18 such that their respective surface features engage each other, i.e., the annular projection 164 on the mounting member is received in the annular groove 154 of the damping element, which secures the damping element in the mounting member. In this assembled condition, the damping element 26 and the mounting member 18 are aligned such that the upper end 156 of the damping element extends slightly vertically above the upper end 166 of the mounting member. The lower end 168 of the damping element 26 is positioned within the central opening 58 of the mounting member 18, above the lower end 168.

The horn ring 120 has a circular bottom wall 180 with a central circular opening 182 and a cylindrical side wall 184 that extends upward (as viewed in the figures) from an annular periphery of the bottom wall. A contact arm 186 extends laterally from the side wall 184 and includes a horn contact 103, such as a rivet, that projects upward.

The lower end 168 of the mounting member 18 extends through the opening 182 of the horn ring 120. The lower locking elements 172 include retention surfaces 176 that engage a lower surface 188 of the bottom wall 180 of the horn ring 120. An inner surface 190 of the bottom wall 180 defining the central opening 182 encircles the outer surface 162 of the mounting member 18. As shown in FIG. 15, there can be some space between the inner surface 190 and the outer surface 162.

The mounting ring 106 has a generally ring-shaped configuration and includes an upper rim 200 and a lower rim 202 separated by an annular groove 204. A central opening 206 extends through the mounting ring 106. An annular edge 208 of the switch plate 100 defining the mounting opening 104 is received in the annular groove 204 to connect the mounting ring 106 to the switch plate.

The upper end 166 of the mounting member 18 extends through the opening 206 of the mounting ring 106. The upper flange 170 includes a lower surface 210 that engages an upper surface 212 of the mounting ring 106. An inner surface 214 of the mounting ring 106 defining the central opening 206 encircles the outer surface 162 of the mounting member 18. As shown in FIG. 15, there can be some space between the inner surface 214 and the outer surface 162.

The spring 140 is positioned around or encircling the outer surface 162 of the mounting member 18. The spring extends along the outer surface 162 between the mounting ring 106 and the horn ring 120. The spring 140 has an upper end 216 that engages a bottom surface 218 of the mounting ring 106 and a lower end 220 that engages an upper surface 222 of the horn ring 120. The lower end 216 of the spring 140 can be seated in an annular space defined by the mounting member 18, the bottom wall 180 of the horn ring 120, and the side wall 184 of the horn ring.

The shoulder screw 66 includes a screw head 68 and a shank 70. The shank 70 includes a spacer portion 74 and a threaded portion 76. The spacer portion 74 has a diameter that is greater than the threaded portion 76. An annular stop portion 78 of the shank 70 extends between these diameters.

In the assembled condition of the portion of the steering wheel 10 illustrated in FIGS. 15-16, the mounting projection 110 of the hub plate 36 is received in the mounting structure 18. The shoulder screw 66 is installed with outer threads of the threaded portion 76 of the shank 70 engaging the threaded central opening 112 of the mounting projection 110. This aligns the components of the coupling device 16 with the mounting projection 110 and the mounting opening/ring 104, 106 along a screw axis S.

Tightening the screw 66 causes the stop portion 78 to engage an end surface 230 of the mounting projection 110. The axial length of the damping element 26 coincides with the length of the screw shank spacer portion 70, so that the upper end 156 of the damping element engages the screw head 68 and the lower end 158 of the damping element engages the end surface 230 of the mounting projection 110. The mounting member 18, having an axial length greater than the damping element 26, extends downward beyond the upper end surface 230 of the mounting projection 110, terminating with the lower end 168 spaced from the hub plate 36.

The inside diameter of the mounting member 18 is greater than the outside diameter of the mounting projection 110, thereby creating an annular clearance 232 between the mounting member and the mounting projection. The damping element 26 extends axially above the flange 170 of the mounting element such that the screw head 68 engages the damping element, but not the flange. This creates an annular clearance 238 between the flange 170 and the screw head 68.

From the above, it will be appreciated that the configuration of the coupling device 16, the switch plate 100, and the hub plate 36 is such that the mechanical interface between the steering wheel/hub plate and the airbag module is only through the vibration-damping material 27 of the damping element 26. The clearances 232 and 238 space the airbag module 14 from the rigid structure of the steering wheel structure 12 and the screw 66, which is mechanically fastened to the steering wheel structure. The damping element 26 de-couples the airbag module 14 from the steering wheel structure 12 and can therefore act as a vibration damper to avoid undesired steering wheel vibrations. The damping element 26 suspends the mounting member 18, and the airbag module 14 connected to the mounting member, from the steering wheel structure 12 and therefore completely isolates the airbag module from the steering wheel structure. The airbag module 14 can therefore oscillate relative to the steering wheel structure 12.

The switch plate 100 is configured for movement along the axis S relative to the horn ring 120 against the bias of the spring 140. The materials used to construct the mounting member 18 and the mounting ring 106 are selected so that the mounting ring 106 can slide easily over the outer surface 162 of the mounting member. This sliding movement can also be facilitated by the clearance between the inner surface 214 of the mounting ring 106 and the outer surface 162 of the mounting structure. The mounting member 18 and mounting ring 106 can, for example, be constructed of a plastic or elastomeric material.

The switch plate 100 can be moved along the axis S against the bias of the spring 140 when the operator presses or pushes on the airbag module 14, such as on the airbag module cover 54. This moves the switch plate 100 against the bias of the spring 140 from the position illustrated in FIG. 15 to the position illustrated in FIG. 16, in which the horn contacts 102 and 103 engage each other.

Figure 17:
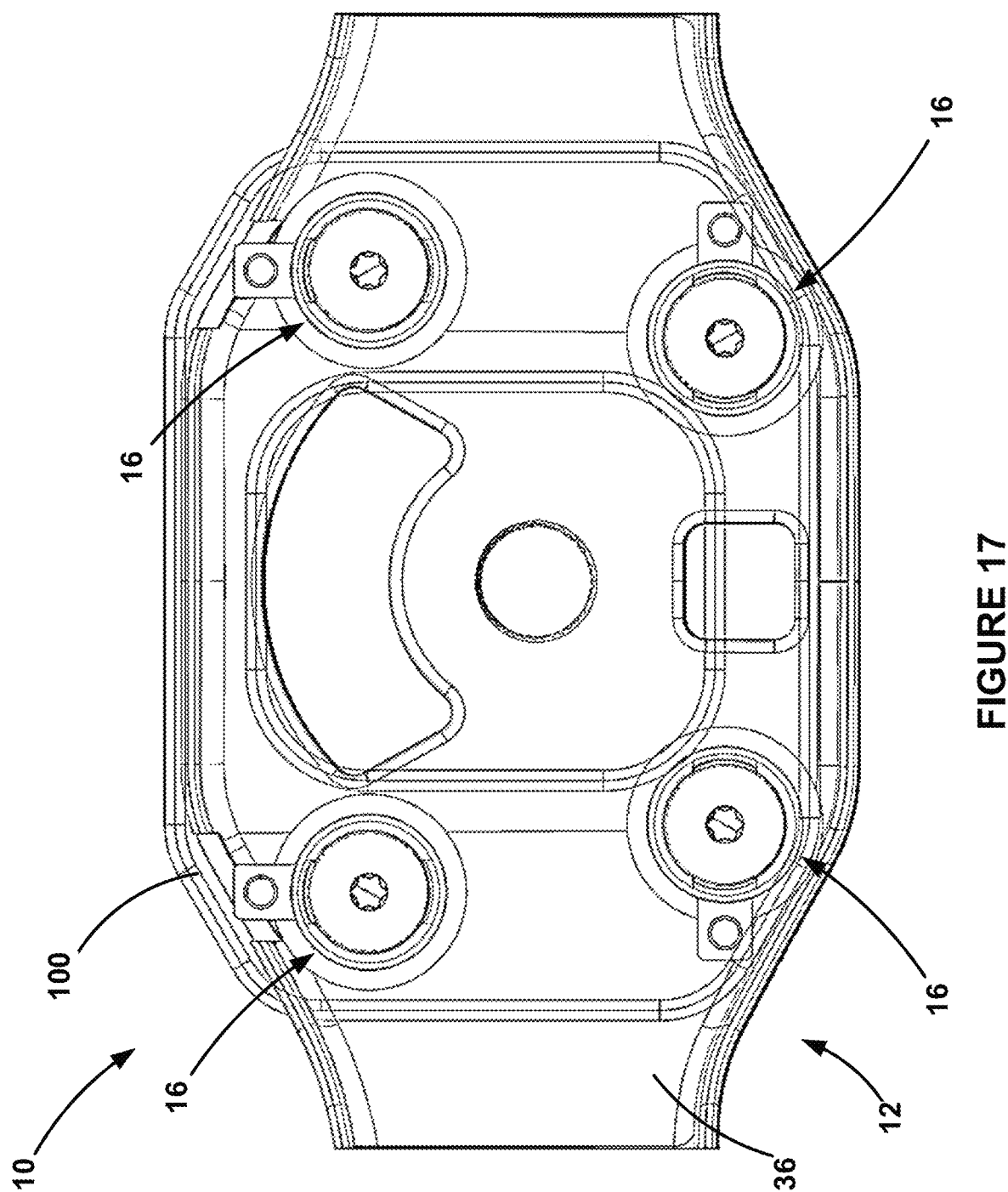
FIG. 17 is a plan view illustrating an assembled condition of the steering wheel of FIG. 14.

While the configuration and function of the components of the steering wheel 10 have been described in terms of a single coupling device 16 and mounting location on the hub plate 36 and switch plate 100, it should be appreciated that the configurations and functions are identical at all (four) mounting locations on the steering wheel. This is shown in FIG. 17, which shows the hub plate 36, the horn plate 100 (in phantom lines), and the coupling devices 16 connecting the horn plate to the hub plate at four locations.

From the above, it will be appreciated that the configuration of the steering wheel 10 de-couples the vibration damping function of the coupling device 16 from the horn switch actuation function of the coupling device. Actuation of the horn does not depend on airbag module 14 movement relative to the hub plate 36 facilitated by the damping element 26. Conversely, vibration damping does not depend on airbag module 14 movement relative to the hub plate 36 facilitated by the horn actuation components.

Figure 18:
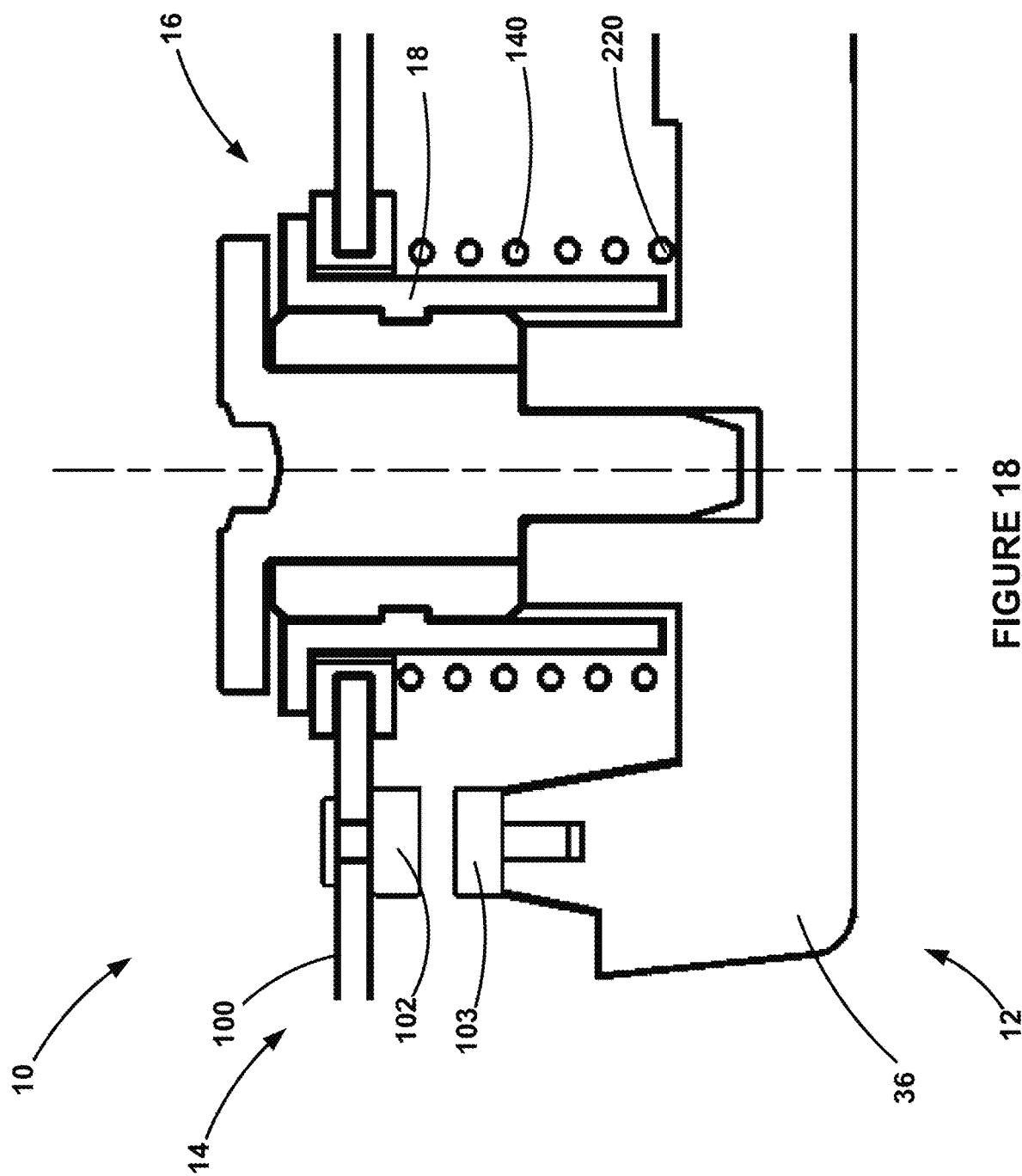
FIG. 18 is a sectional view illustrating an alternative configuration of certain components.

FIG. 18 illustrates another configuration of the steering wheel 10. The steering wheel configuration of FIG. 18 is similar or identical in some aspects to the configuration of FIGS. 14-17 with a few exceptions. In the configuration of FIG. 18, the horn ring 120 is omitted from the coupling device 16 and the hub plate 36 is reconfigured to carry the horn contact 103. In this configuration, the lower end 220 of the spring 140 can abut an upper surface of the hub plate, which can allow for the elimination of the lower locking element of the mounting member 18. Functionally, the configuration of FIG. 18 is identical to the configuration of FIGS. 14-17, and can therefore provide the vibration damping and horn switch actuation functionality described above.

Figure 19:
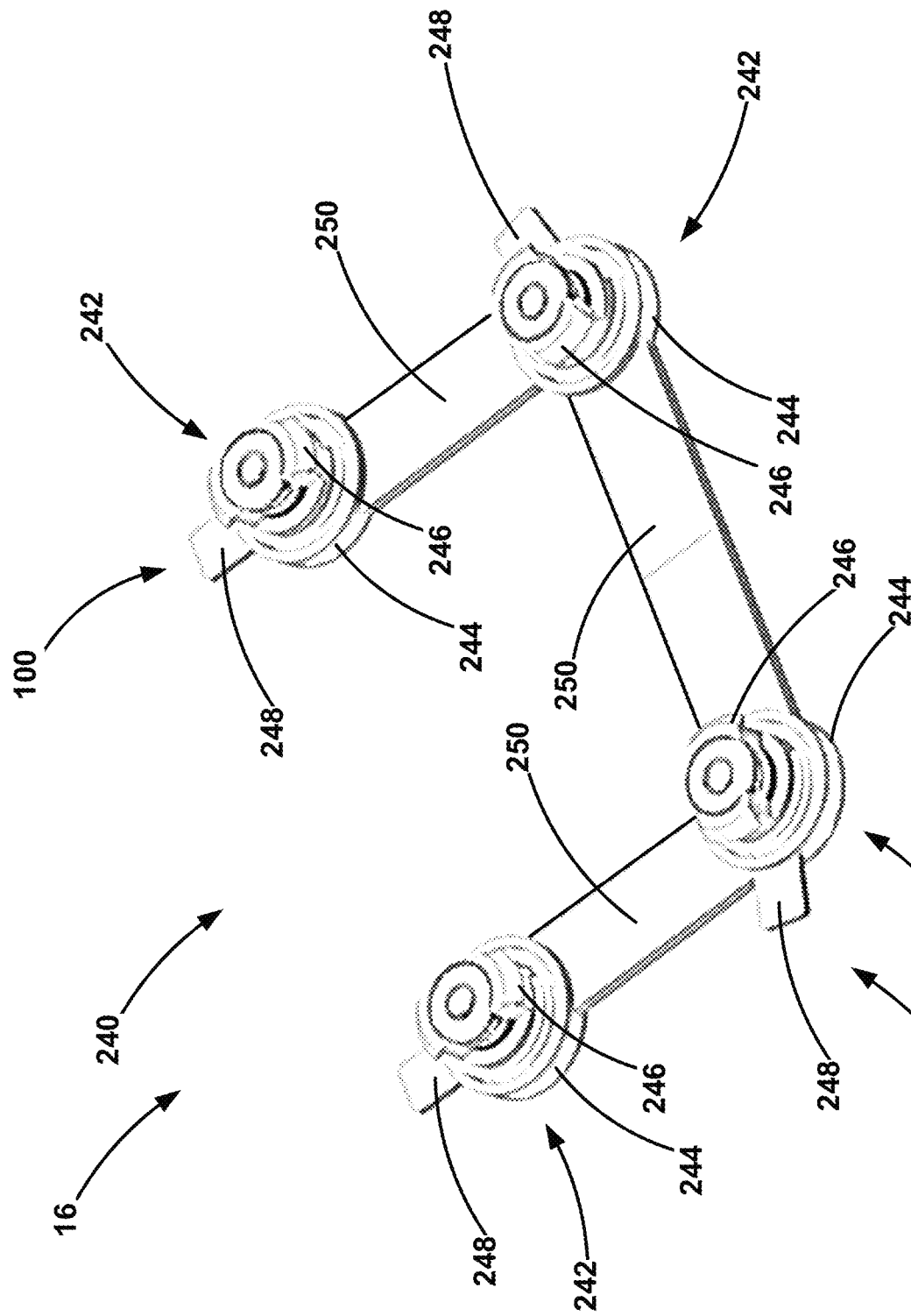
FIGS. 19 and 20 are perspective views illustrating another alternative configuration of certain components.
Figure 20:
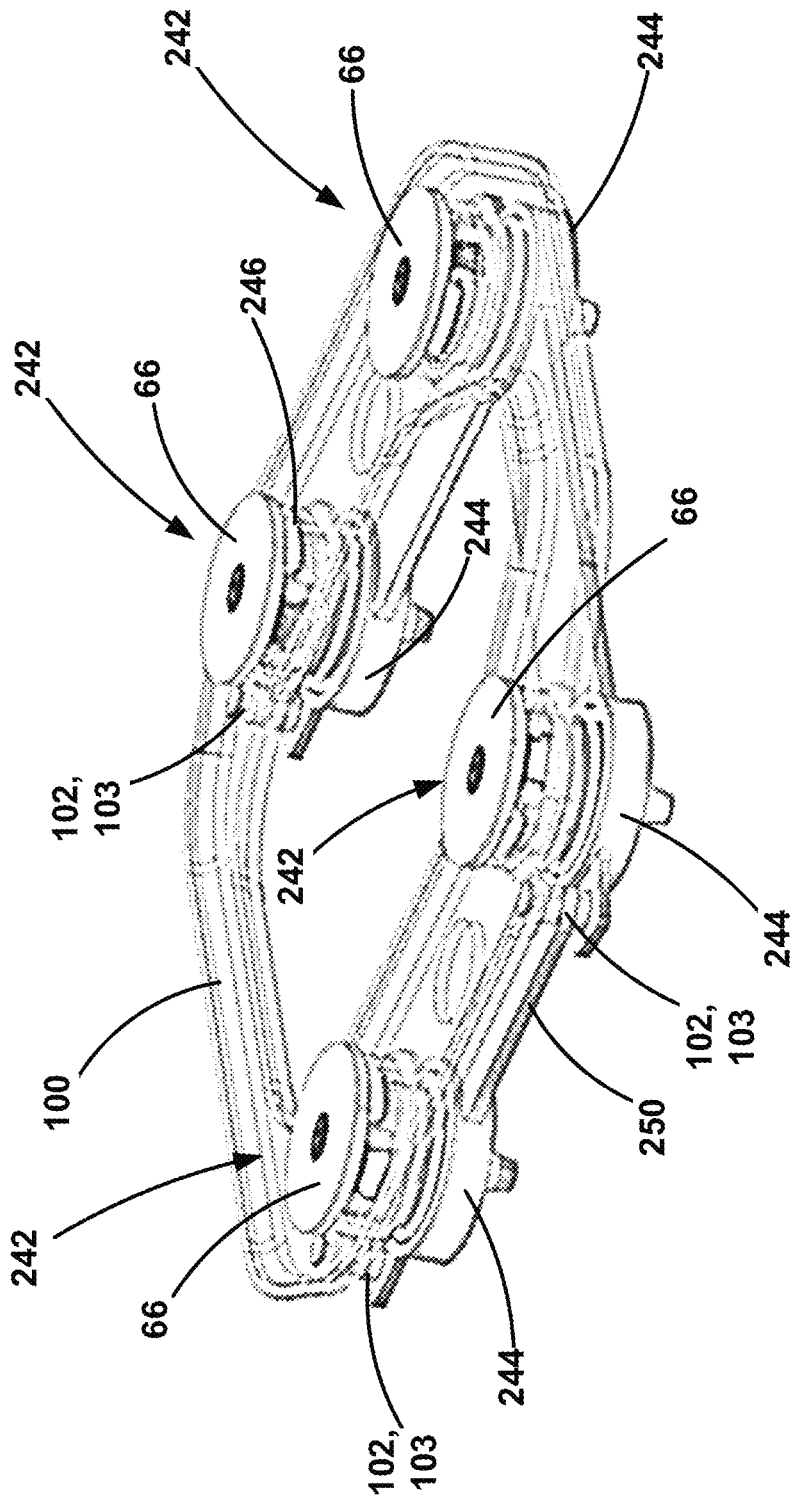
Figure 21:
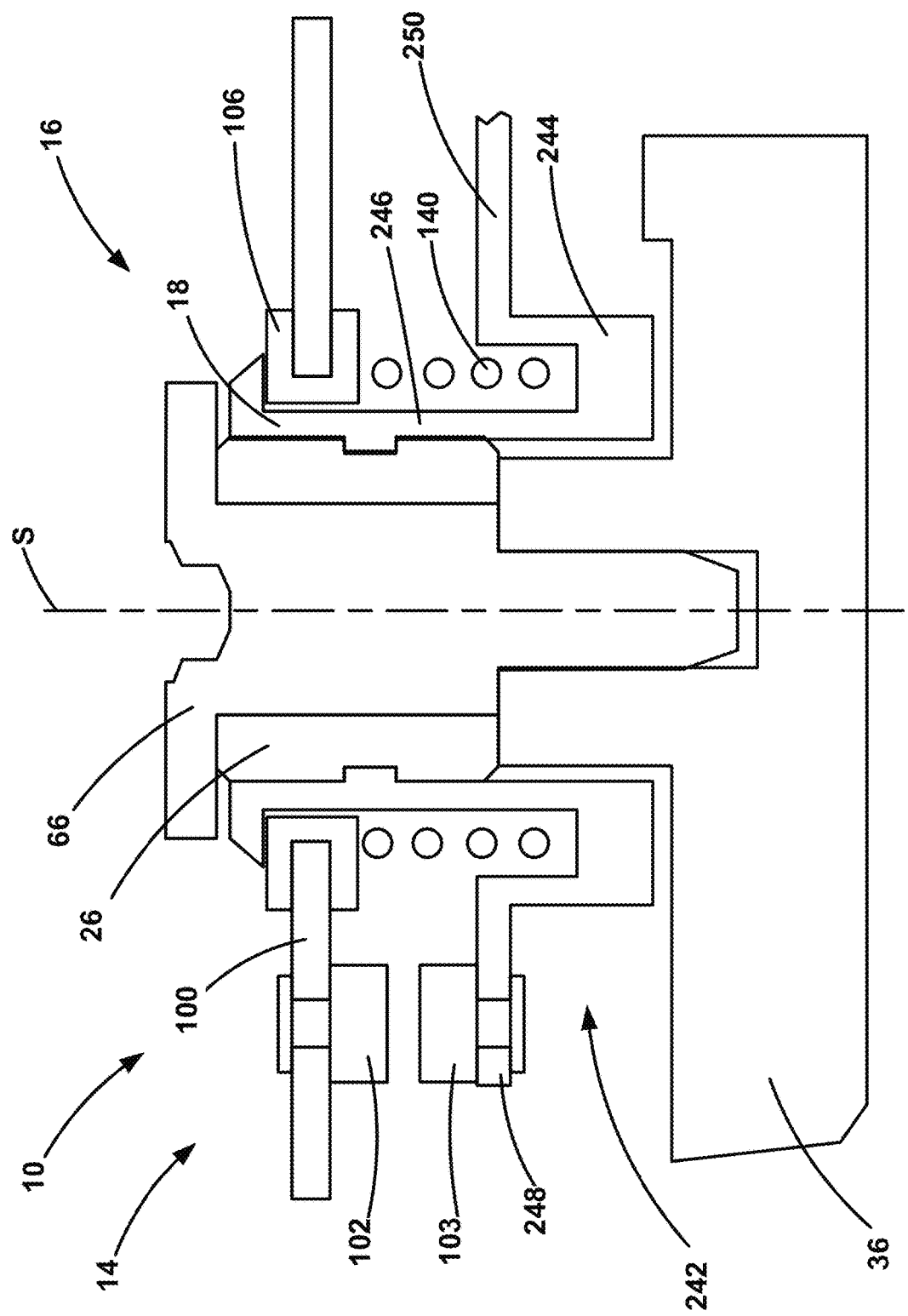
FIG. 21 is a sectional view illustrating certain components of the configuration of FIGS. 19 and 20.

FIGS. 19-21 illustrate another configuration of the coupling device 16. In the configuration of FIGS. 19-21, a single component performs the functions of the both the mounting member and the horn ring for all four mounting locations. As shown in FIG. 19, a mounting structure 240 includes four mounts 242, each of which include a base 244 for receiving the lower end of the spring 140. Centered within and extending upward from the base 244 is a sleeve 246. The base 244 has the general form and performs the functions of the horn ring in FIGS. 14-17. The sleeve 246 has the general form and performs the functions of the mounting member in FIGS. 14-17. At each mount 242 also includes a tab 248 for supporting the horn contact 103.

The mounts 242 are interconnected with each other by bracket arms 250 that extend in a U-shaped manner between the mounts. The single component construction of the mounting structure 240 advantageously can reduce the complexity of the assembly and the number of components used to assemble the steering wheel, while simultaneously providing the vibration damping and horn switch actuation functionality described above.

As shown in FIG. 19, the mounts 242 are configured to receive the damping element 26 and the horn switch plate 100, including the mounting rings 106, in the same manner described above in regard to the configuration of FIGS. 14-17. This allows the shoulder screws 66 (see FIG. 20) to secure the horn switch plate 100 and the mounting structure 240 to the steering wheel hub plate (not shown), again in the same manner described above in regard to the configuration of FIGS. 14-17.

Figure 22:
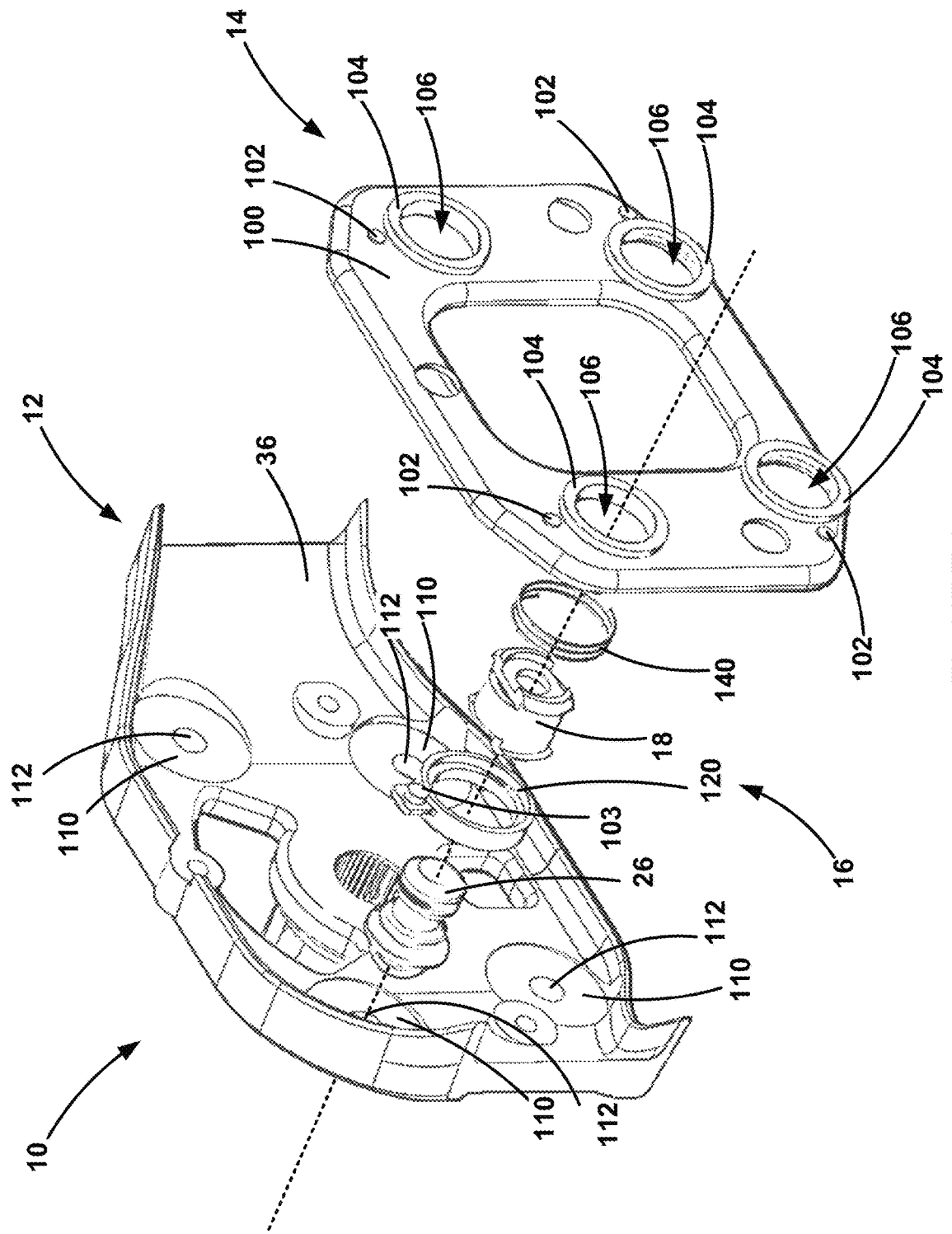
FIG. 22 is an exploded perspective view of a vehicle steering wheel including a coupling device for connecting an airbag module to the steering wheel structure, according to another example configuration.
Figure 23:
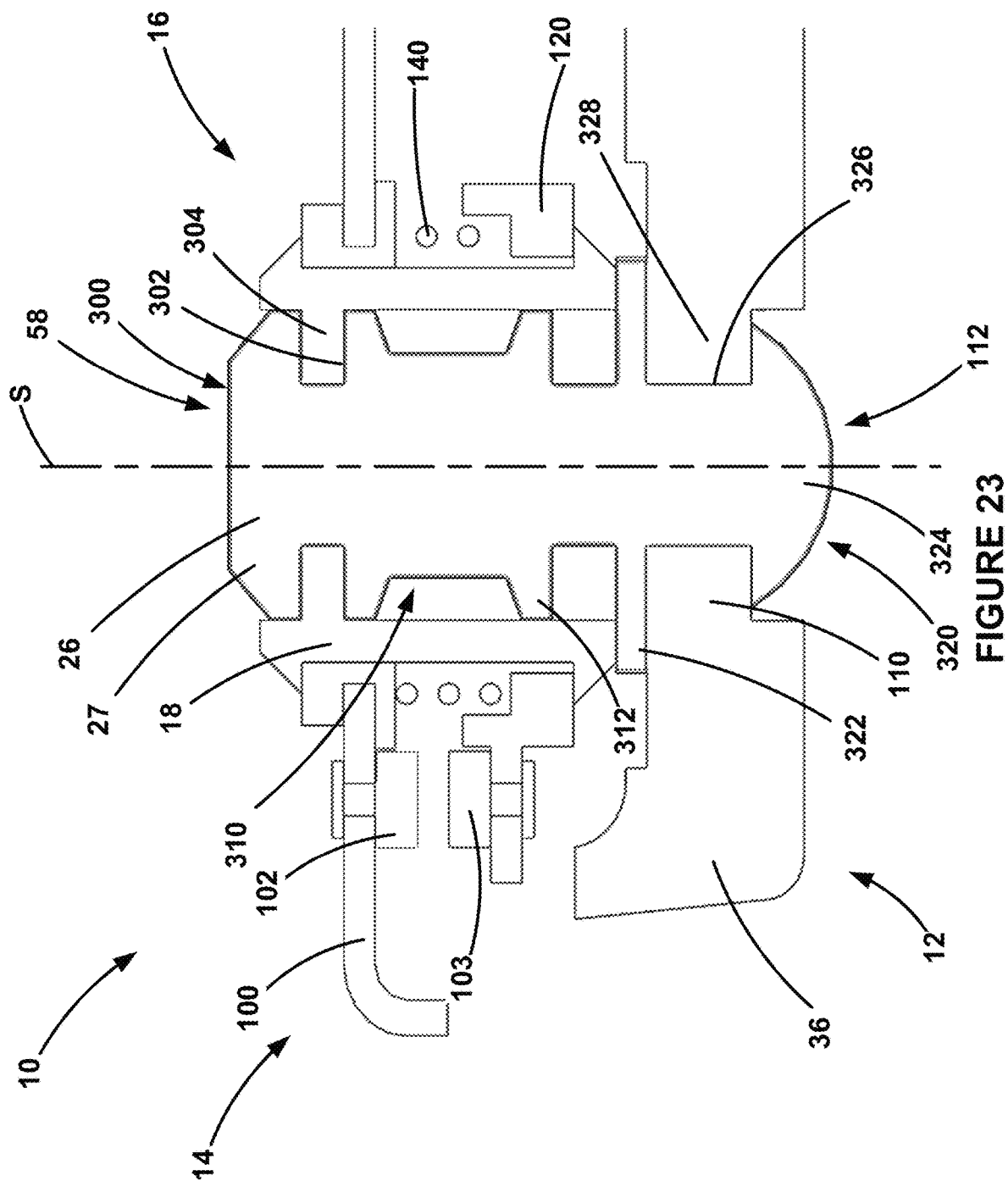
FIG. 23 are sectional views of the steering wheel of FIG. 22.

A further embodiment of the coupling device 16 shown in FIGS. 22-23. In this embodiment, as with other embodiments, the coupling device 16 includes a vibration damping element 26 that extends through an opening 58 of a mounting member 18. FIGS. 22-23 illustrate the coupling device 16 implemented in a steering wheel 12 to connect an airbag module 14 to a steering wheel structure 12. The steering wheel configuration of FIGS. 22-23 is similar or identical in some aspects to previous configurations, such as the configuration of FIGS. 14-17, with a few exceptions. In the configuration of FIGS. 22-23, the screw is omitted and the damping element 26 is configured to both connect the airbag module 14 to the steering wheel structure 12 and provide steering wheel vibration damping.

FIG. 22 is an exploded view illustrating how the coupling device 16 interfaces with the steering wheel structure 12 and the airbag module 14. More specifically, the coupling device 16 connects a horn switch plate 100 to the hub plate 36 of the steering wheel structure 12. To facilitate this connection, the hub plate 36 includes mounting locations 110 each of which includes a central opening 112. The switch plate 100 can be a portion of the airbag module 14 or can be a separate component connectable with the airbag module.

In terms of horn switch functionality, the configuration of FIGS. 22-23 is essentially similar or identical to that of the configuration of FIGS. 14-17. The switch plate 100 moves toward the horn ring 120 against the bias of the spring 140 in response to occupant pressure applied to the airbag module 14 to bring together the horn contacts 102, 103. The relative movement of the switch plate 100 to the horn ring 120 is independent of compression/deflection of the damping element 26.

Referring to FIG. 23, the damping element 26 is made from vibration-damping material 27 and has a generally cylindrical configuration of varying diameters along its length. The damping element 26 includes an upper head portion 300 for connecting to the mounting member 18, a central body portion 310 positioned within the mounting member 18, and a lower fastening portion 320 connectable with the steering wheel structure 12.

The head portion 300 has an outer diameter about equal to the inner diameter of the mounting member 18. The diameter of the head portion 300 can be slightly larger than the inner diameter of the mounting member 18 so as to form an interference fit with the mounting member. An annular groove 302 receives an inwardly projecting annular locking rim 304 of the mounting member, which locks the damping member 26 in the mounting member 18.

The body portion 310 extends from the head portion 300 inside the mounting member 18 and has an outer diameter that creates an annular clearance between the body portion and the mounting member. At a lower extent, the body portion 310 includes an annular guide rim 312 that extends outward into engagement with an inner surface of the mounting member 18. The guide rim 312 helps maintain the alignment of the mounting member 18 and damping member 26 along the axis S.

The fastening portion 320 includes an upper annular flange 322 and a lower locking head 324 spaced apart by an annular locking groove 326. The fastening portion 320 extends through the central opening 112 of the mounting location 110 so that an annular rim portion 328 of the hub plate 36 defining the central opening is received in the locking groove 326. This connects the airbag module 14 to the steering wheel structure 12.

The coupling device 16 is configured so that the mechanical interface between the steering wheel structure 12/hub plate 36 and the airbag module 14 is only through the vibration-damping material 27 of the damping element 26. The head portion 300 of the damping element 26 is connected to the mounting structure 18, and the fastening portion 320 is connected to the hub plate 36. The upper annular flange 322 of the fastening portion is positioned between the lower end of the mounting structure 18 and the hub plate 36. The damping element 26 thus de-couples the airbag module 14 from the steering wheel structure 12 and can therefore act as a vibration damper to avoid undesired steering wheel vibrations.

From the above, it will be appreciated that the configuration of the steering wheel 10 de-couples the vibration damping function of the coupling device 16 from the horn switch actuation function of the coupling device. Actuation of the horn does not depend on airbag module 14 movement relative to the hub plate 36 facilitated by the damping element 26. Conversely, vibration damping does not depend on airbag module 14 movement relative to the hub plate 36 facilitated by the horn actuation components.

Figure 24:
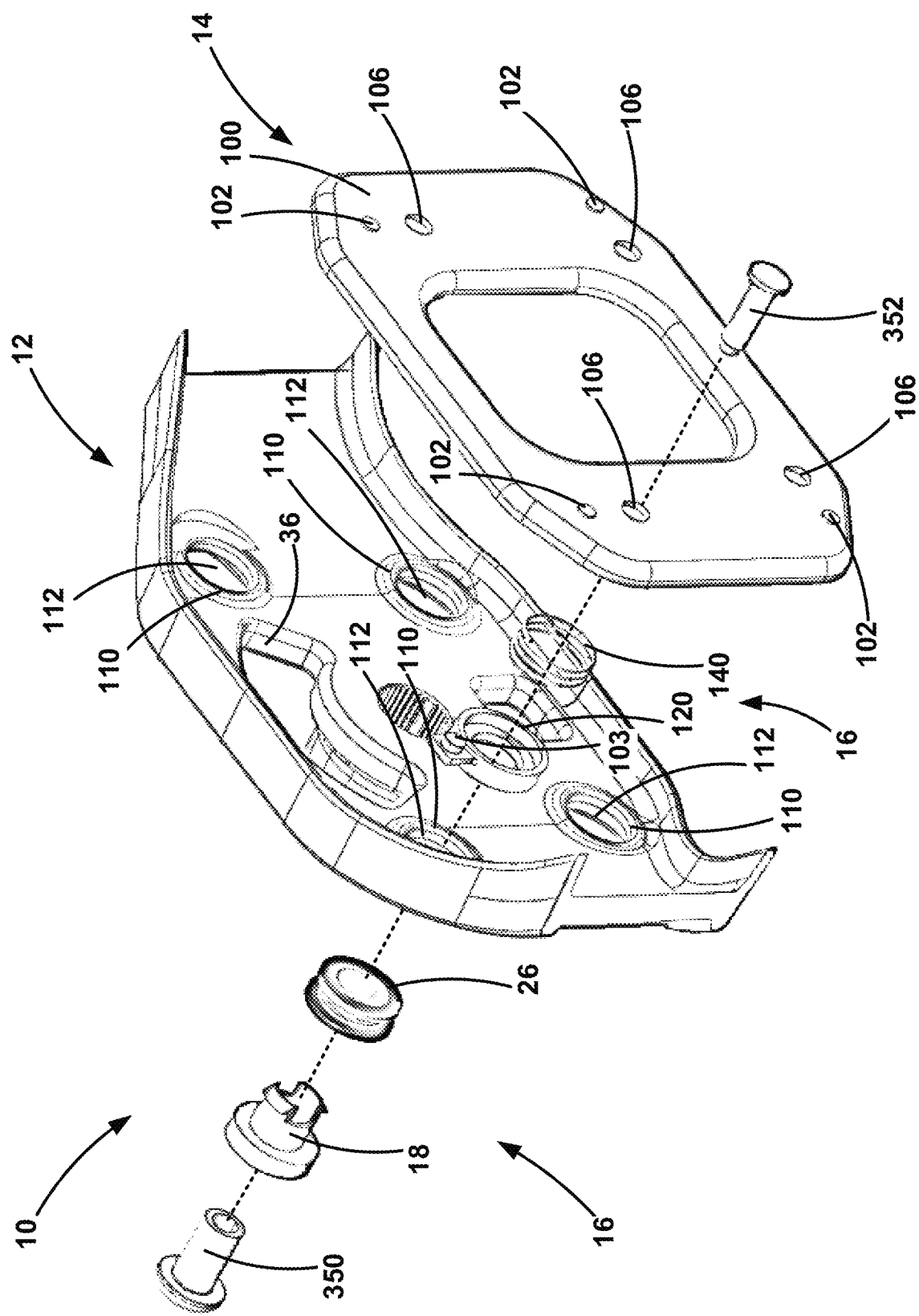
FIG. 24 is an exploded perspective view of a vehicle steering wheel including a coupling device for connecting an airbag module to the steering wheel structure, according to another example configuration.
Figure 25:
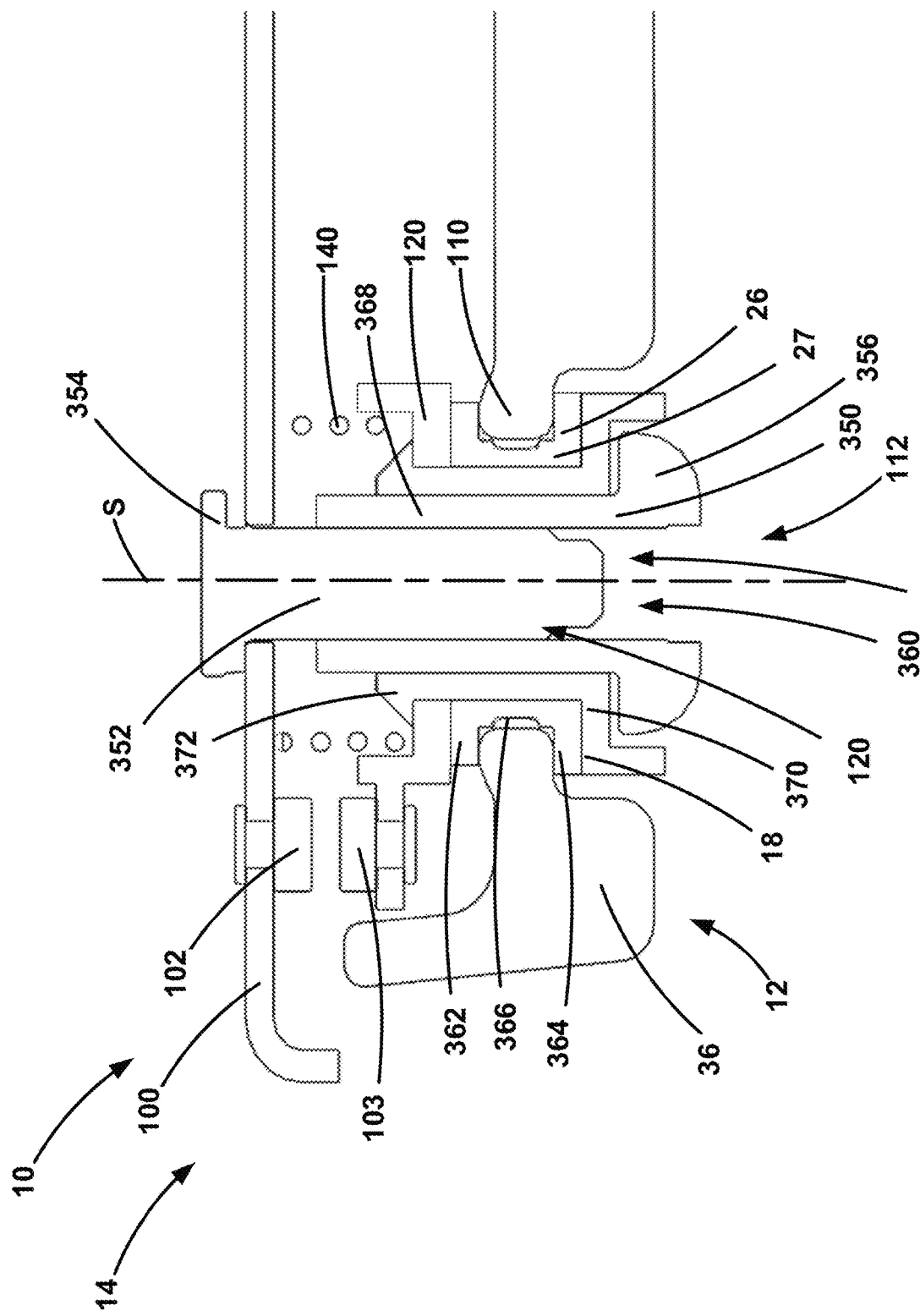
FIG. 25 are sectional views of the steering wheel of FIG. 24.

A further embodiment of the coupling device 16 shown in FIGS. 24-25. In this embodiment, as with other embodiments, the coupling device 16 includes a vibration damping element 26 and a mounting member 18. FIGS. 24-25 illustrate the coupling device 16 implemented in a steering wheel 12 to connect an airbag module 14 to a steering wheel structure 12. The steering wheel configuration of FIGS. 24-25 is similar or identical in some aspects to previous configurations. In the configuration of FIGS. 24-25, the damping element 26 is positioned outside the mounting member 18 and interfaces directly with the hub plate 36 to connect the airbag module 14 to the steering wheel structure 12. To facilitate this configuration, the coupling device 16 includes a fastener including an internally threaded bolt 350 and an externally threaded stud 352 for making the connection between the steering wheel structure 12 and the airbag module 14.

FIG. 24 is an exploded view illustrating how the coupling device 16 interfaces with the steering wheel structure 12 and the airbag module 14. More specifically, the coupling device 16 connects a horn switch plate 100 to the hub plate 36 of the steering wheel structure 12. To facilitate this connection, the hub plate 36 includes mounting locations 110 each of which includes a central opening 112. The switch plate 100 can be a portion of the airbag module 14 or can be a separate component connectable with the airbag module.

In terms of horn switch functionality, the configuration of FIGS. 24-25 is essentially similar or identical to that of other configurations disclosed herein. The switch plate 100 moves toward the horn ring 120 against the bias of the spring 140 in response to occupant pressure applied to the airbag module 14 to bring together the horn contacts 102, 103. The relative movement of the switch plate 100 to the horn ring 120 is independent of compression/deflection of the damping element 26.

Referring to FIG. 25, the damping element 26 is made from vibration-damping material 27 and has a generally cylindrical configuration of varying diameters along its length. The damping element 26 has a ring shaped configuration including an open central passage 360 and includes an upper rim 362, a lower rim portion 364, and a central annular groove 366 positioned between the rims.

The damping element 26 is positioned over the mounting member 18 so that a sleeve portion 368 of the mounting member passes through the central passage 360. The mounting member 18 includes a lower rim portion 370 against which the lower rim portion 364 of the damping element 26 rests. The horn switch ring 120 is positioned over the sleeve portion 368 of the mounting member 18 and rests against the upper rim portion 362 of the damping element 26. An upper locking member 372 of the mounting member retains the horn switch ring 120 on the mounting member 18.

The stud 352 passes through the switch plate 100 and extends into a central passage 374 of the mounting member 18. A head 354 of the stud 352 engages the switch plate 100. The bolt 350 passes through the central passage 374 of the mounting member 18 and engages and is threaded onto the stud 352, which maintains the components aligned along the axis S. A head 356 of the bolt 350 engages the lower rim portion 370 of the mounting member 18 on a side opposite the damping element 26. The switch plate 100 rides along the stud 352 against the bias of the spring in response to pressure applied to the airbag module 14 to move the horn contacts 102, 103 into engagement with each other.

The coupling device 16 is configured so that the mechanical interface between the steering wheel structure 12/hub plate 36 and the airbag module 14 is only through the vibration-damping material 27 of the damping element 26. The damping element 26 is the only structure that engages the hub plate 36 to couple the airbag module 14 to the steering wheel structure 12. The damping element 26 thus de-couples the airbag module 14 from the steering wheel structure 12 and can therefore act as a vibration damper to avoid undesired steering wheel vibrations.

From the above, it will be appreciated that the configuration of the steering wheel 10 de-couples the vibration damping function of the coupling device 16 from the horn switch actuation function of the coupling device. Actuation of the horn does not depend on airbag module 14 movement relative to the hub plate 36 facilitated by the damping element 26. Conversely, vibration damping does not depend on airbag module 14 movement relative to the hub plate 36 facilitated by the horn actuation components.

From the above description of the invention, those skilled in the art will perceive improvements, changes and modifications. Such improvements, changes and modifications within the skill of the art are intended to be covered by the appended claims.

The invention claimed is:

1. A coupling device for mounting an airbag module to be oscillating on a steering wheel structure of a vehicle steering wheel, comprising:
    a mounting member comprising a cylindrical wall having a cylindrical inner surface and a cylindrical outer surface, an annular flange that extends radially outward from an upper end of the cylindrical wall, and an annular projection that extends radially inward from the inner surface of the cylindrical wall;
    a damping element comprising a cylindrical body of damping material having a cylindrical inner surface and a cylindrical outer surface, an annular recess extending radially inward into the outer surface of the damping element, the damping element being positioned inside the mounting member so that the outer surface of the damping element engages the inner surface of the mounting member, and so that the annular projection of the mounting member is received in the annular recess of the damping element so that the damping element is retained in the mounting member;
    a fastener configured to extend through the damping element and to connect the coupling device to the steering wheel structure; and
    a spring fitted over the outer surface of the mounting member, the spring configured to bias the airbag module away from the steering wheel structure;
    wherein the damping member is configured to support the mounting member on the steering wheel structure and space the mounting member from direct engagement with the steering wheel structure in order to isolate the mounting member from vibrations in the steering wheel structure.

2. The coupling device recited in claim 1, wherein:
    the mounting member comprises an upper flange that projects radially outward from the cylindrical outer surface of the mounting member;
    the damping element comprises an upper axial end portion that projects from an upper surface of the upper flange of the mounting member when installed in the mounting member; and
    the fastener comprises a head portion configured to engage the upper axial end portion of the damping member, and to be spaced from the upper surface of the upper flange, when fastened to the steering wheel structure.

3. The coupling device recited in claim 2, wherein:
    the fastener comprises a shank comprising a spacer portion that extends axially from the head portion and is configured to engage the inner cylindrical surface of the damping member, and a threaded portion that extends axially from the spacer portion;
    the threaded portion is configured to be threaded into the steering wheel structure to secure the coupling device to the steering wheel structure;
    the spacer is configured to engage the steering wheel structure when the threaded portion is threaded into the steering wheel structure; and
    the damping member is configured to be compressed between the head portion of the fastener and the steering wheel structure when the coupling device is connected to the steering wheel structure.

4. The coupling device recited in claim 3, wherein the spacer has a diameter that is greater than the diameter of the threaded portion, which creates a stop surface that extends radially outward of the threaded portion, the stop surface being configured to engage the steering wheel structure when the fastener is threaded into the steering wheel structure to connect the coupling device to the steering wheel structure.

5. The coupling device recited in claim 1, wherein the mounting member comprises a locking element that projects outward from the cylindrical outer surface of the mounting member, the locking element comprising a surface that the spring is configured to engage and against which the spring biases the airbag module.

6. The coupling device recited in claim 1, further comprising a mounting ring configured to couple with the airbag module and to be fitted onto the mounting member encircling the cylindrical outer surface of the mounting member, the mounting ring being configured to slide along the outer surface of the mounting member.

7. The coupling device recited in claim 6, wherein the spring is configured to engage the mounting ring and to exert spring bias acting on the mounting ring in order to bias the airbag module away from the steering wheel structure.

8. The coupling device recited in claim 1, wherein:
    the steering wheel structure comprises a mounting projection that projects from a surface of the steering wheel structure;
    the mounting projection comprising an end surface against which an axial end of the damping element is positioned when the coupling device is connected to the steering wheel structure; and
    the mounting member is configured so that the cylindrical wall of the mounting member extends axially beyond the end surface of the mounting projection and encircles the mounting projection when the coupling device is connected to the steering wheel structure.

9. The coupling device recited in claim 8, wherein:
the fastener comprises a shank comprising a spacer portion that extends axially from the head portion and is configured to engage the inner cylindrical surface of the damping member, and a threaded portion that extends axially from the spacer portion;
the threaded portion is configured to be threaded into the mounting projection to secure the coupling device to the steering wheel structure;
the spacer is configured to engage the mounting projection when the threaded portion is threaded into the steering wheel structure; and
the damping member is configured to be compressed between the head portion of the fastener and the mounting projection when the coupling device is connected to the steering wheel structure.

10. The coupling device recited in claim 9, wherein the spacer has a diameter that is greater than the diameter of the threaded portion, which creates a stop surface that extends radially outward of the threaded portion, the stop surface being configured to engage the mounting projection when the fastener is threaded into the mounting projection to connect the coupling device to the steering wheel structure.

11. The coupling device recited in claim 8, wherein the mounting member comprises a locking element that projects outward from the cylindrical outer surface of the mounting member, the locking element comprising a surface that the spring is configured to engage and against which the spring biases the airbag module.

12. The coupling device recited in claim 11, wherein the locking element is located at an axial end of the cylindrical wall positioned axially beyond the end surface of the mounting projection.

13. The coupling device recited in claim 11, further comprising a mounting ring configured to couple with the airbag module and to be fitted onto the mounting member encircling the cylindrical outer surface of the mounting member, wherein the mounting ring is configured to slide along the outer surface of the mounting member, and wherein the spring is configured to engage the mounting ring at one end and the locking element at an opposite end.

14. The coupling device recited in claim 8, wherein the spring is configured to encircle the mounting projection and to engage the steering wheel structure.

15. The coupling device recited in claim 1, wherein the airbag module comprises a first horn contact that is movable with the airbag module against the bias of the spring into contact with a second horn contact.

16. The coupling device recited in claim 15, further comprising a horn ring that supports the second horn contact.

17. The coupling device recited in claim 16, wherein the horn ring is supported on the mounting member.

18. The coupling device recited in claim 15, wherein the second horn contact is supported on the steering wheel structure.

19. The coupling device recited in claim 1, wherein the steering wheel structure comprises a steering wheel hub plate.

20. A steering wheel comprising:
a steering wheel structure;
an airbag module; and
the coupling device recited in claim 1, wherein the coupling device connects the airbag module to the steering wheel structure.

* * * * *